(12) United States Patent
Johnson et al.

(10) Patent No.: US 9,121,770 B2
(45) Date of Patent: Sep. 1, 2015

(54) FLOW MANAGEMENT SYSTEM AND METHOD

(75) Inventors: Len Johnson, Calgary (CA); Jonathan E. Airey, Calgary (CA); Steve Conquergood, Calgary (CA)

(73) Assignee: ADVANCED FLOW TECHNOLOGIES INC., Calgary (CA)

( * ) Notice: Subject to any disclaimer, the term of this patent is extended or adjusted under 35 U.S.C. 154(b) by 584 days.

(21) Appl. No.: 13/462,778

(22) Filed: May 2, 2012

(65) Prior Publication Data

US 2013/0041588 A1    Feb. 14, 2013

Related U.S. Application Data

(60) Provisional application No. 61/521,647, filed on Aug. 9, 2011.

(51) Int. Cl.
| | |
|---|---|
| G06F 19/00 | (2011.01) |
| G01K 13/00 | (2006.01) |
| G01K 3/08 | (2006.01) |
| E21B 47/06 | (2012.01) |
| E21B 47/10 | (2012.01) |
| G01K 13/02 | (2006.01) |

(52) U.S. Cl.
CPC ............... *G01K 3/08* (2013.01); *E21B 47/065* (2013.01); *E21B 47/10* (2013.01); *G01K 13/02* (2013.01); *G01K 2013/024* (2013.01)

(58) Field of Classification Search
CPC ....... E21B 47/065; E21B 47/10; E21B 43/00; E21B 49/008; G01K 13/02; G01K 2013/024; G01K 3/08
USPC ............. 702/12, 45, 99, 100; 95/267; 166/52, 166/57; 374/136
See application file for complete search history.

(56) References Cited

U.S. PATENT DOCUMENTS

| | | | | |
|---|---|---|---|---|
| 4,369,049 | A * | 1/1983 | Heath | ............................. 95/267 |
| 2010/0023269 | A1 * | 1/2010 | Yusti et al. | ...................... 702/12 |

\* cited by examiner

*Primary Examiner* — John H Le
(74) *Attorney, Agent, or Firm* — Goodwin Law; Sean Goodwin

(57) ABSTRACT

A monitoring tool is provided for monitoring wells for flow anomalies. The temperatures of flowing well fluid and ambient temperature are monitored and various methods applied to indicate if a well is normal flowing, at risk of flow stoppage or cessation of flow. Approaches are described for determining trending indicators from actual flow temperatures compared to a normal flow relationship for establishing the presence of flow anomalies. Temperature sensors, onsite processors and communications upload data for display of well status flags on a mapping module enabling pro-active detection and preventative action by operators.

23 Claims, 26 Drawing Sheets

FLOW MANAGEMENT SYSTEM AND METHOD

FIELD

This invention relates generally to a system and method for monitoring flow in gas and oil wells. More particularly, the invention relates to detection and notification of well failures including diminishing or loss of flow rate, which can be caused by freeze offs, water loading, sand, scale, mechanical equipment failure including pump jacks, downhole pumps, engines, hydraulics, sucker rod, continuous rod, valves, piping, and operational issues including gas locks, tubing leaks, field injection variations.

BACKGROUND

Flowing wells can fail unexpectedly, the detection of which or preventative measures The Province of Alberta, Canada has over 70,000 low flow, shallow gas wells, producers annually lose 5-15% of their wintertime production due to freezing of wells and pipelines. The lost production can cost the producers in the range of $70-100 million annually. Due to the low revenue generation of individual wells, shallow gas fields and mature oil fields generally have very little instrumentation. Production measurement tends to happen at group meters and batteries, which reside throughout a field, and usually have dozens or more unmetered wells flowing into them. In the case of oil wells, the causes of failure are more numerous, including more mechanical apparatus in wells fit with pumping apparatus.

In the winter, producers watch their group meters for production drops, which typically indicate that wells upstream of the meter are frozen. Field personnel then either attempt to find the frozen wells and inject a freeze inhibitor such as methanol (methanol lowers the freezing temperature of water) in an attempt to break up the ice or simply "batch pour" methanol into wells more or less indiscriminately as a preventive measure. Methanol injection method, which has been used for decades, is often ineffective, expensive and potentially unsafe including arranging risky wintertime access to leases regardless whether wells are frozen or not.

Applicant believes, this method persists because there is currently no other solution which is not cost prohibitive. At current prices an average gas well produces $15,000-20,000 per year in revenue. Traditional instrumentation which could indicate the status of each well costs in excess of $5,000 per well. Given the large numbers of such wells, producers have not justified traditional instrumentation on most wells.

While oil wells have higher revenues, control is also more expensive, often implementing pump-off controls. It is not always economical to pump-off and related instrumentation on older lower flow oil wells.

In summer, producers note diminished flow rates from gas wells due to liquid loading in the wells and may take steps to rectify the problem by unloading the liquid from the well.

SUMMARY

Generally, a low cost tool is provided for monitoring wells for flow anomalies. In winter conditions, early detection and predictive techniques can avoid un-necessary, expensive and environmentally sensitive dosing of wells with methanol or other freeze inhibiting agents. Further, personnel are not placed at personal risk in the travelling and attending of well sites that are not in need of attention. Further, in any season, such detection provides certainty to operators including understanding well production variation and equipment reliability. Notification can be through a variety of means including electronic alerts or visual alerts such through a map view feature.

Systems and kits, as described herein, can be installed by the end user and need not require electrical infrastructure not be near a utility. Hence, older wells can be retrofit where it has otherwise been uneconomical for implementing pump-off controls or instrumentation.

In one aspect, a method is provided for identifying wellhead flow anomalies comprising collecting actual flow temperatures and ambient temperatures for establishing a normal flow relationship for flow from the wellhead for various ambient temperatures, measuring actual flow temperatures over time for flow from the wellhead and measuring ambient temperature and determining trending indicators from the actual flow temperature compared to the normal flow relationship for establishing wellhead flow anomalies.

DESCRIPTION

Embodiments described herein are directed to a flow management system that captures information from a well and transmits the captured information to a remote location for further processing in order to determine whether the well is flowing normally or not.

In one embodiment the captured information is processed to determine whether the flowrate from the well is normal or abnormal.

In another embodiment, the captured information is processed to determine whether the well is frozen or about to freeze.

In another embodiment, the captured information is processed to determine whether the operability of the well for the flow production of the product fluids is compromised, such as through impending or sudden mechanical or process failure.

Further, the processed data is correlated in a graphic representation with location of the wells and represented in forms including a red, yellow and green status, which provide producers with a highly specific level of information regarding the status of the wells.

Embodiments are explained herein in the context of monitoring flow in wells during winter. The graphs described herein illustrate the studies carried out by the Applicant. The principles herein apply to gas wells and to oil wells.

Figure 1A:
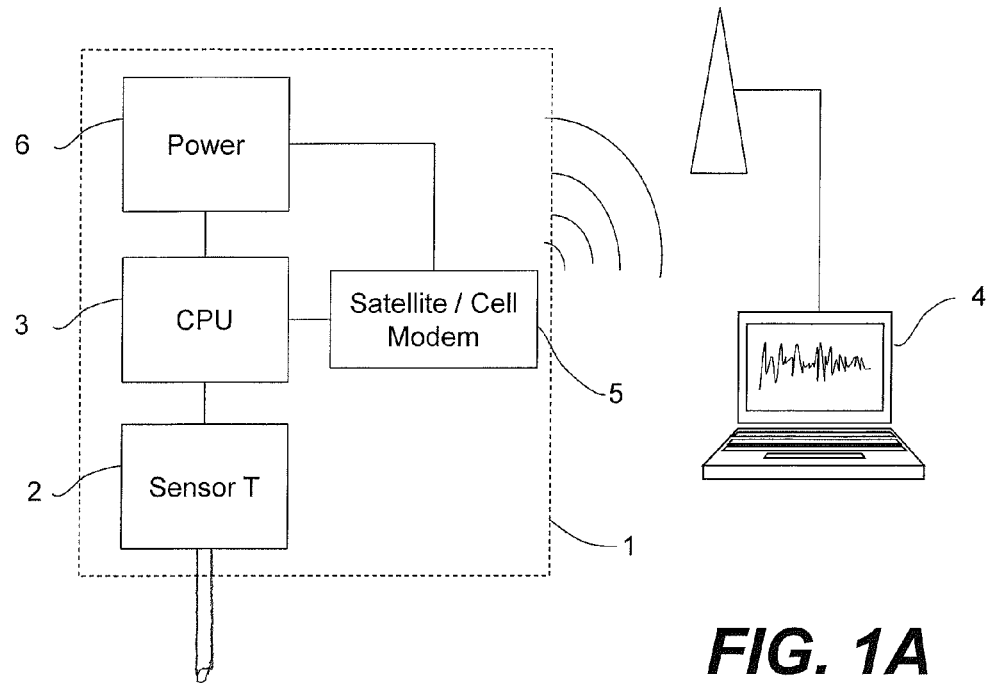
FIG. 1A is a block diagram of one embodiment of a flow monitoring and analysis system, applied to a gas well.
Figure 1B:
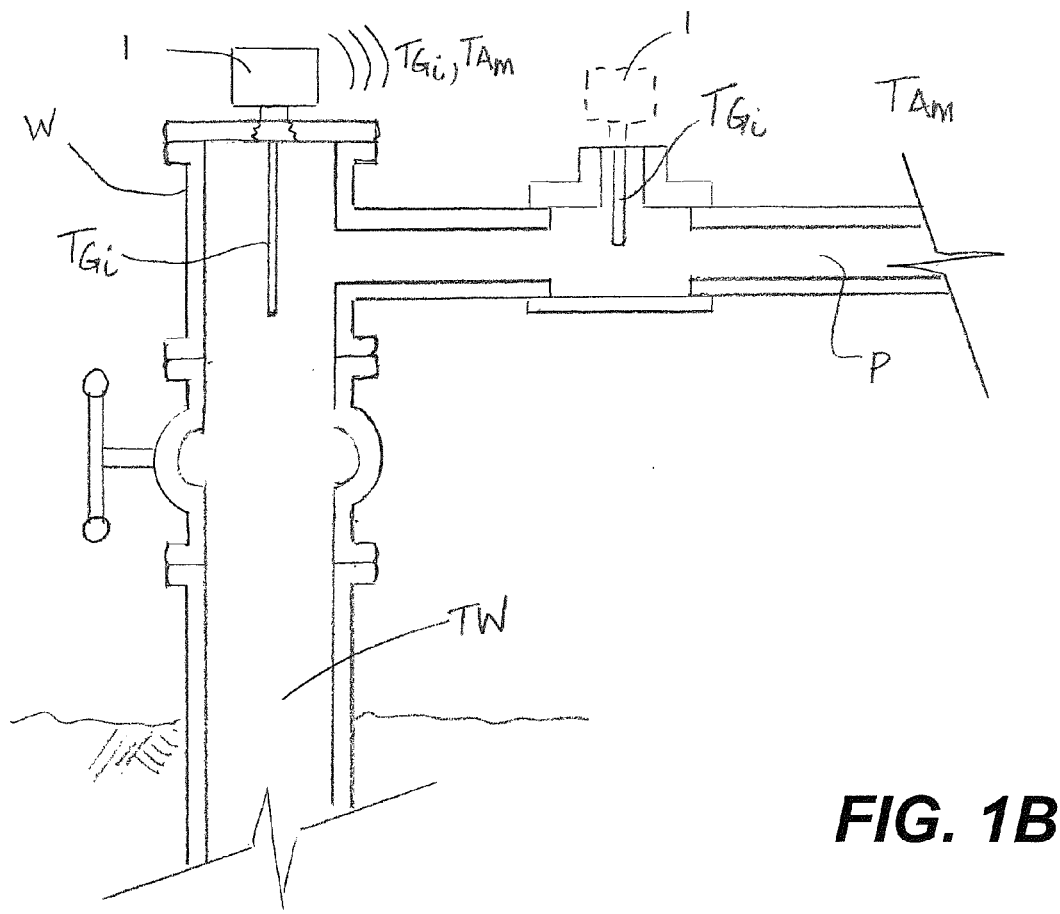
FIG. 1B is a simplified cross-section of a wellhead having a temperature sensor installed at various optional locations.

FIG. 1A is a block diagram of one embodiment of the system of the invention. FIG. 1B is a general schematic illustration of various ways of locating the system of FIG. 1A at a well site. Access to the flow stream can include thermowells to separate the pressure boundary from the sensor, or direct access through tee fittings.

With reference to FIG. 1B, one or more components of the system 1 is installed in a wellhead W or in a pipe P conducting fluid therein adjacent the wellhead W. The fluid is a varying mixture of gas, water, and oil. Typically in wellhead applications, data is moved from wellhead locations via 4-20 mA or 1-5V dc signals to a remote terminal unit (RTU). The RTU then sends the data to a centrally located computer based system by radio transmission. Herein, the system 1 comprises a sensor 2 which senses the temperature of the gas flowing in the pipe i.e. internal gas temperature (Gi) and the ambient temperature (Am) at the well site. The sensor 2 is connected to a processor 3 which may include storage or memory. The captured temperature information is stored in the processor 3. The system 1 further comprises a communication transmission device, such as a satellite modem 5 for transmitting the captured information to a remote processing unit 4 for further processing. In one embodiment, the system 1 is capable of processing at least some of the captured information. The captured information can be transmitted to the remote processing unit 4 by other communication methods such as radio or cell phone communication. The remote processing unit can be a server. The server can provided notification to operators and others through various means including electronic messaging and mapping. The various components of the system 1 are powered by a power source 6. Typically the power source is a battery. Some or all of the captured information is processed or analyzed at the remote processing unit 4 to determine the status of the well i.e. to determine whether the well is flowing or whether the well is frozen or whether the well is about to freeze.

The system 1 can have a small number of components and can be easily assembled. In one embodiment, the system 1 can sense and transmit parameters such as flow and pressure in the conduit.

Processing or Analysis

Applicant has studied the temperature of fluids flowing from wells. In one case, Applicant has noted the characteristics of gas flowing from shallow wells, their studies indicating the following:

A. The temperature of gas emanating from shallow wells is typically very stable. When flowing normally, the temperature of the gas in the well (Gi) is in the range of about 5-8° Celsius (Tw) regardless of ambient temperature (Am). Tw is related to the formation temperature, variable with depth. Applicant has established Tw for various well formations after extensive studies and data analysis.

Figure 2:
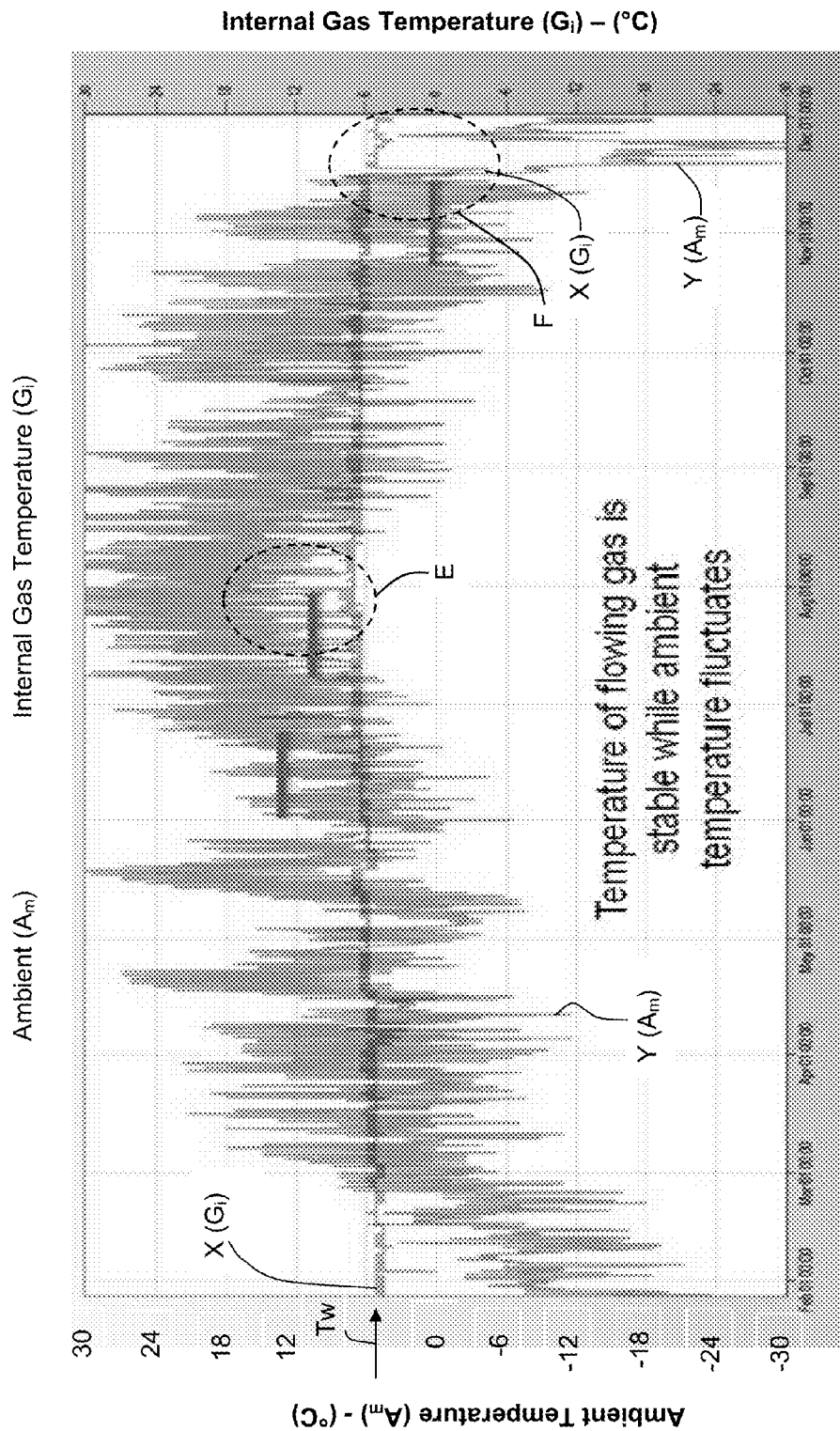
FIG. 2 is a time graph of the flowing temperatures of gas from a gas well over time as the ambient temperatures vary in a winter season.

B. When a well stops flowing, temperature inside the pipe (Gi) moves toward ambient temperature (Am). That is, it will rise in the summer and fall in the winter. Observations at A and B are illustrated in FIG. 2. Internal gas temperature (Gi) is indicated by X and ambient temperature (Am) is indicated by Y. Two things are noticeable in FIG. 2—first, during normal flow, the internal gas temperature (Gi) operates in a very stable zone even while the ambient temperature (Am) fluctuates. Second, if the well is not flowing (circled portions in FIG. 2) temperature inside the pipe i.e. internal gas temperature (Gi) moves toward ambient (Am)—up in the summer (circle E) and down in the winter (circle F).

C. When wells freeze, they do not do so overnight but typically over a period of weeks.

Figure 3:
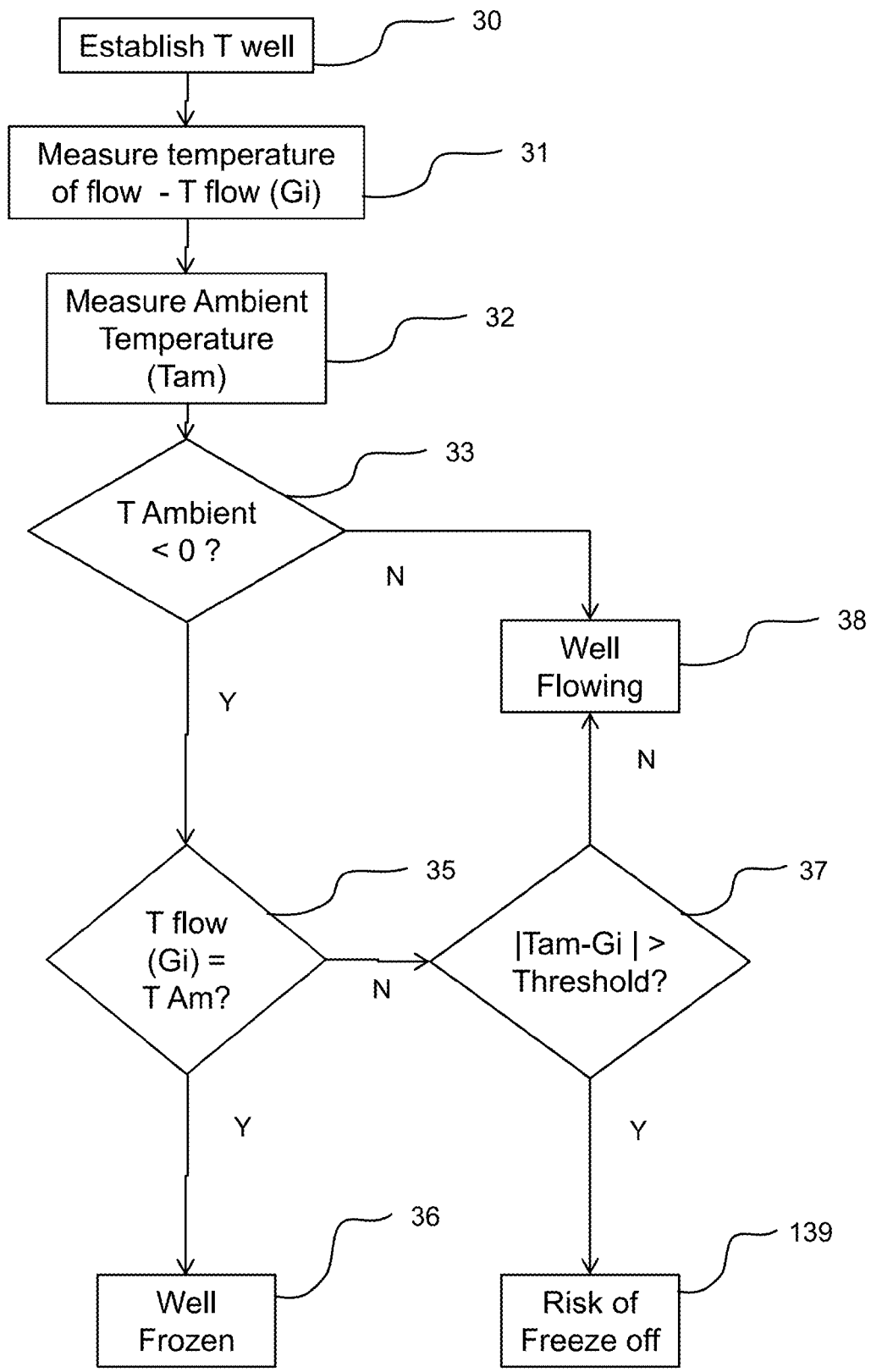
FIG. 3 is a flowchart illustrating various embodiments of a flow obstruction or anomaly detection algorithm.

FIG. 3 is a flowchart illustrating the steps of a flow obstruction or flow anomaly detection algorithm processed at the remote processing unit 4 of FIG. 1 to determine the status of the gas well during winter. The temperature of fluid emanating from the wellbore, Tw, is typically determined at block 30. The internal flowing gas temperature (Gi) at the wellhead (block 31) and the ambient temperature (Am) are measured (block 32) by the sensor 2. If, at block 33, the ambient temperature is less than 0° C., a first simple check is made to determine whether Gi is equal to Tam (block 35) and the well is frozen at block 36. If flowing temperature Gi is equal to Tam, the well is frozen. This indicates that the well needs to unblocked. Typically this is done by injecting methanol. Alternatively, at block 35, If Gi is not equal to Am, a check is made to determine whether the difference between Gi and Am is greater than a set gap threshold (block 37); and if so, at block 38 the well is flowing. If the difference between Gi and Am is not greater than the set gap threshold, meaning the flowing temperatures and the ambient temperature are close or closing, the well is a freeze off candidate, i.e. the well is very likely about to freeze (block 39).

Back at block 33, if the ambient temperature (Am) is greater than freezing (0° C.), the well is flowing at block 38.

Figure 4:
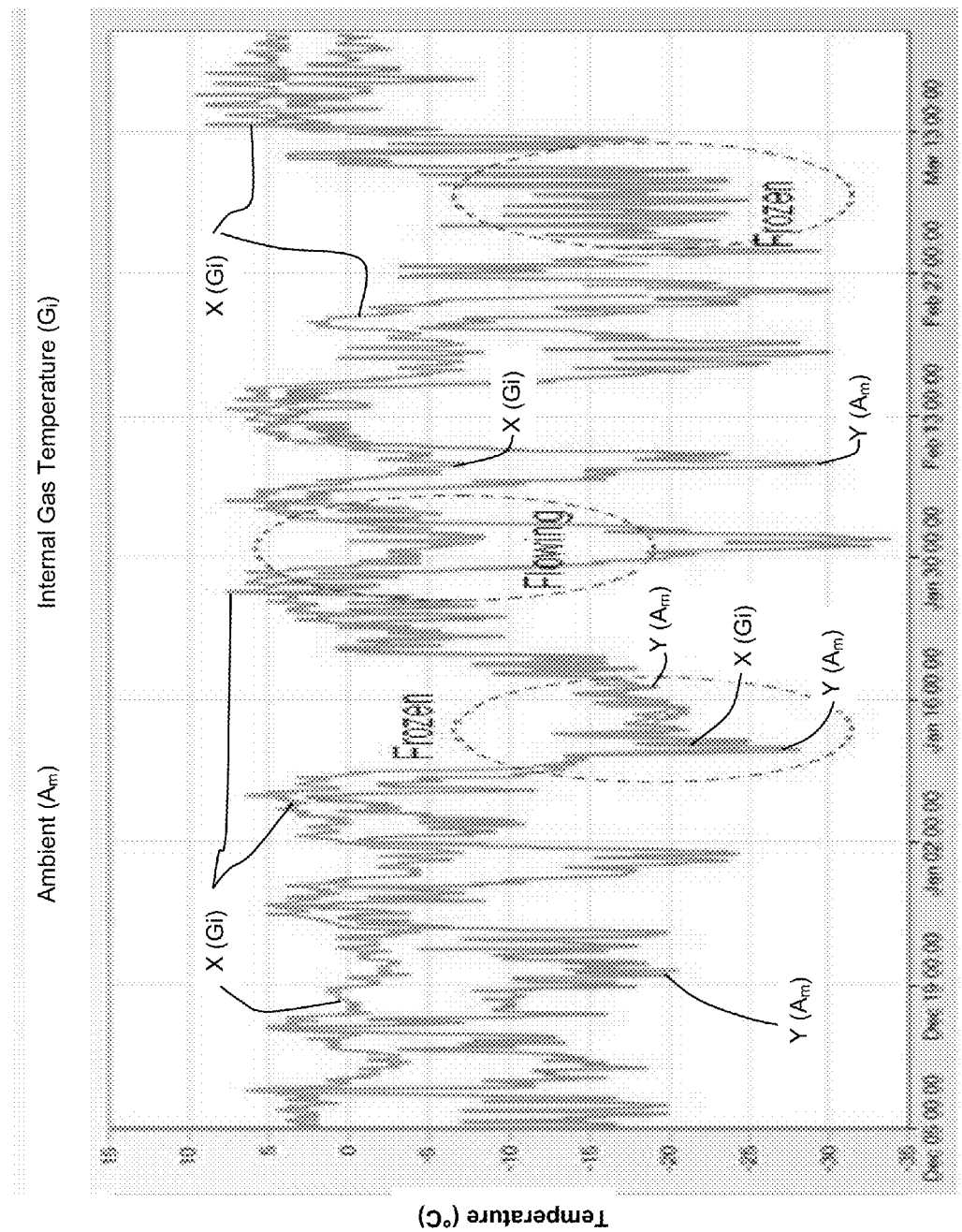
FIG. 4 is a time graph of the temperatures of gas from a gas well over time through a series of flowing and frozen or no flow incidents.

FIG. 4 illustrates the results of the algorithm from block 33. The graph indicates that when the internal gas temperature (Gi and indicated by X) and ambient temperature (Am and indicated by Y) match exactly, the well is frozen and is not flowing. There is a noticeable drop in production when this happens. The graph also indicates that when the internal gas temperature (Gi) diverges from the ambient temperature (Am), the well is flowing. Field personnel can head out to the lease to unblock the wells at the point of first freeze (first dotted circle).

Figure 5:
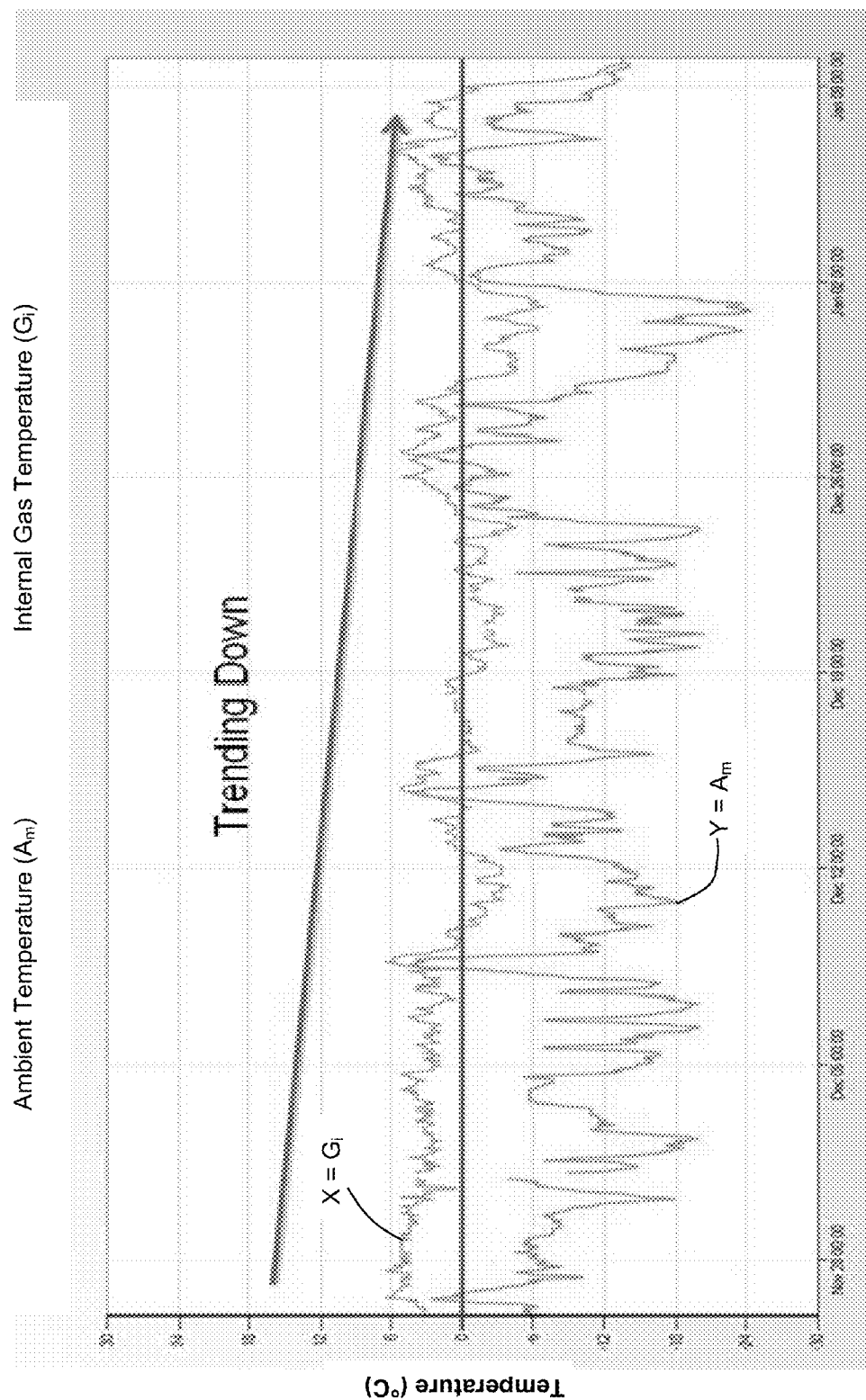
FIG. 5 is a time graph of the temperatures of gas from a gas well trending downward over time, on its way to freezing.

FIG. 5 illustrates the result of block 37. In Alberta, beginning in late November, when ambient temperature (Am) indicated by Y begins to drop (dips below 0° C.), the temperature inside the pipe (Gi) indicated by X begins to trend or drift down. Each time Gi dips below 0° C., ice begins to form. Finally, as seen on the far right of the graph, the well goes into freeze up, some 5 weeks after the process started.

Figure 6:
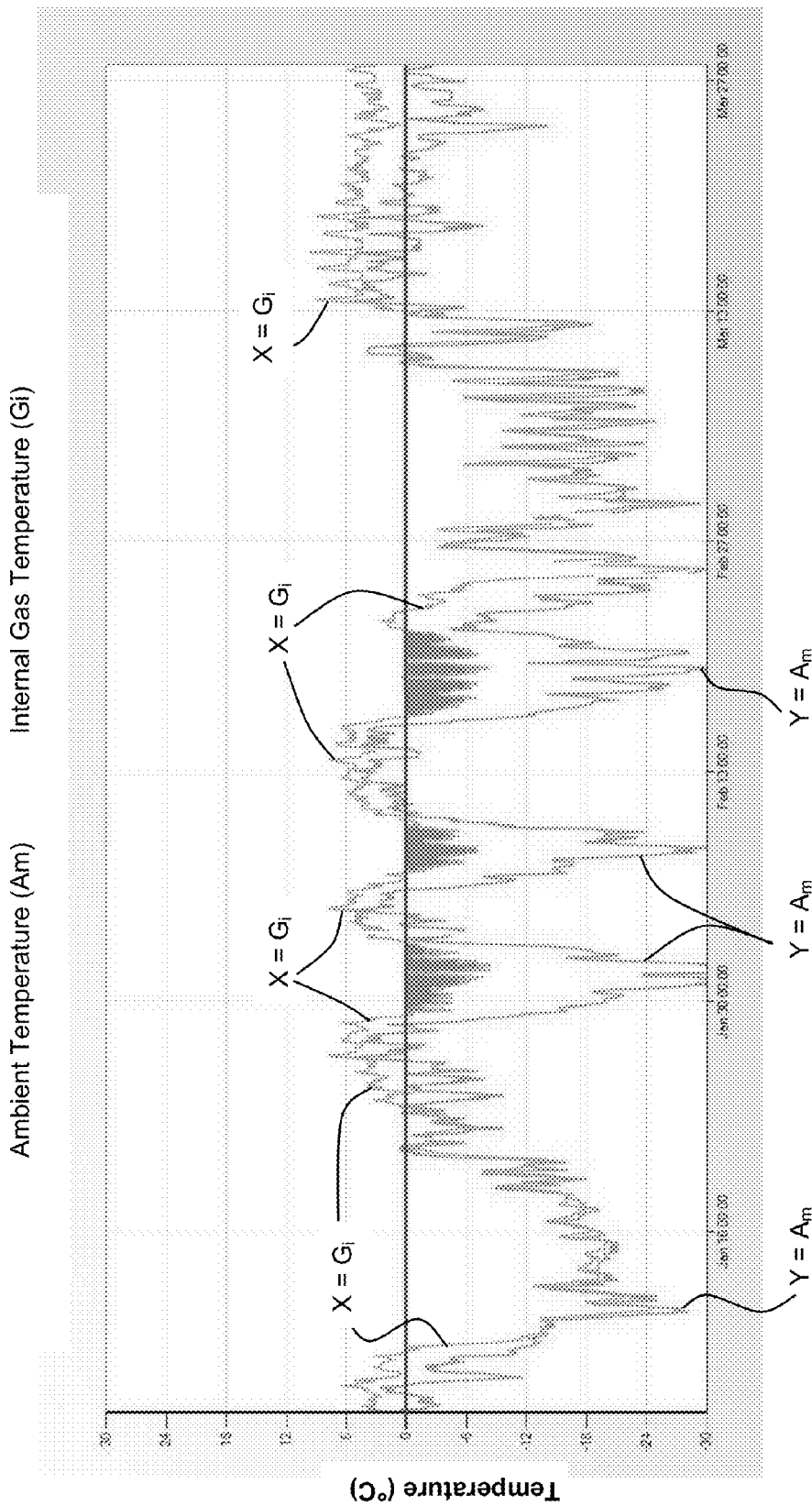
FIG. 6 is a time graph of the temperatures of gas from a gas well over time where methanol is effectively applied once risk of freezing is predicted.

Rather than waiting for the well to freeze completely, the producers can be proactive and apply methanol to the well, and only that candidate well, when the ice starts to form. This is illustrated in FIG. 6, which shows that methanol is applied (shaded portions in the graph) when Gi and Am are below 0° C. and Gi starts trending towards or following Am.

As discussed above, ambient temperature (Am) and internal gas temperature (Gi) are values determined through measurement. Typically, for the gas wells in Alberta, Canada and the purposes of the example detection algorithm, the well temperature Tw is assumed to be 5° C. In one embodiment, the detection algorithm is as follows:

If the Log $10[(abs(5-Am)*(Gi-5)^2)/(if (abs(Gi-Am)<2, 1, ABS(Gi-Am)^2))]>=B$ where Tw was about 5° C. and B is about 2 for a typical gas well, then the flow is likely interrupted or close to freeze up. Action needs to be taken to avoid freeze up interruption of the flow.

If $(abs(Gi-Am)<B$, where B=2 then a Trend of flow temperature is determined as $\log_{10}[abs(Tw-Am)*(Gi-Tw)^2]$ and if the value of the Trend$>=$B then there is risk of flow stoppage.

If $(abs(Gi-Am)>=B$ then a Trend of flow temperature is determined as $\log_{10}[(abs(Tw-Am)*(Gi-Tw)^2)/abs(Gi-Am)^2)]$ and if the value of the Trend$>=$B then there is a risk of flow stoppage.

Further, as has been determined to be applicable to gas flows from a gas well, a trend of the rate of change (TrendR) of the difference between flow temperature and ambient temperature can be indicative of flow anomalies, wherein Rate Trend or TrendR=$d(Gi-Am)*abs(Gi1-Am1)^2>100$ where $d(Gi-Am)=(Gi1-Am1)/(Gi0-Am0)$.

Where an average of the last dynamic period (say three hours) of the TrendR is greater than a threshold, say about 100, then the flow is identified as having resumed normal flow and no action needs to be taken.

The term abs(Gi–Am)^2 is used in both flow interrupted and flow resumed equations to weight the value of the data point. When the ambient temperature Am is close to the gas internal temperature Gi then there is a possibility that the well can freeze.

According to one embodiment, anomalies are spotted by determining the slope (Gi@max–Gi@min)/(Ammax–Ammin) over a time period; typically a time period over a prior 24 hours is suitable for detection. The time period of 24 hours typically includes a wide range of ambient temperature through a day and night cycle, and provides a sufficient data sample.

According another embodiment, flow stoppage or freeze off can be predicted by looking at the square of the cumulative error. A best fit line/polynomial equation is used to fit the flowing data. New ambient data points are taken and the internal gas temperature is predicted based on the best fit line. The error is the difference from the predicted and actual, the difference being zero when the two are the same. For normal flow, variation of the difference falling below zero generally cancels with variations above zero. If the cumulative error is increasing then this points towards a pending freeze off or no flow situation.

According to another embodiment, freeze offs can be predicted by looking at the distribution of gas temperatures at a specific ambient temperature. The further from the mean, the greater is the suggestion that the flow is in the process of being interrupted.

According to another embodiment, freeze offs can be predicted by looking at determining values predicting what the flow temperature would be, based on ambient conditions when there is no flow. Based on how closely the data matches the no flow prediction model suggests would indicate whether or not the well is flowing or not.

Presentation And Mapping of Processed Information

Managing information from potentially thousands of wells can be a daunting task for producers. Therefore, in order to make it easier for producers to use the processed information i.e. state of the wells, the processed information is presented in a form which can be readily read and understood by the producers.

Figure 7:
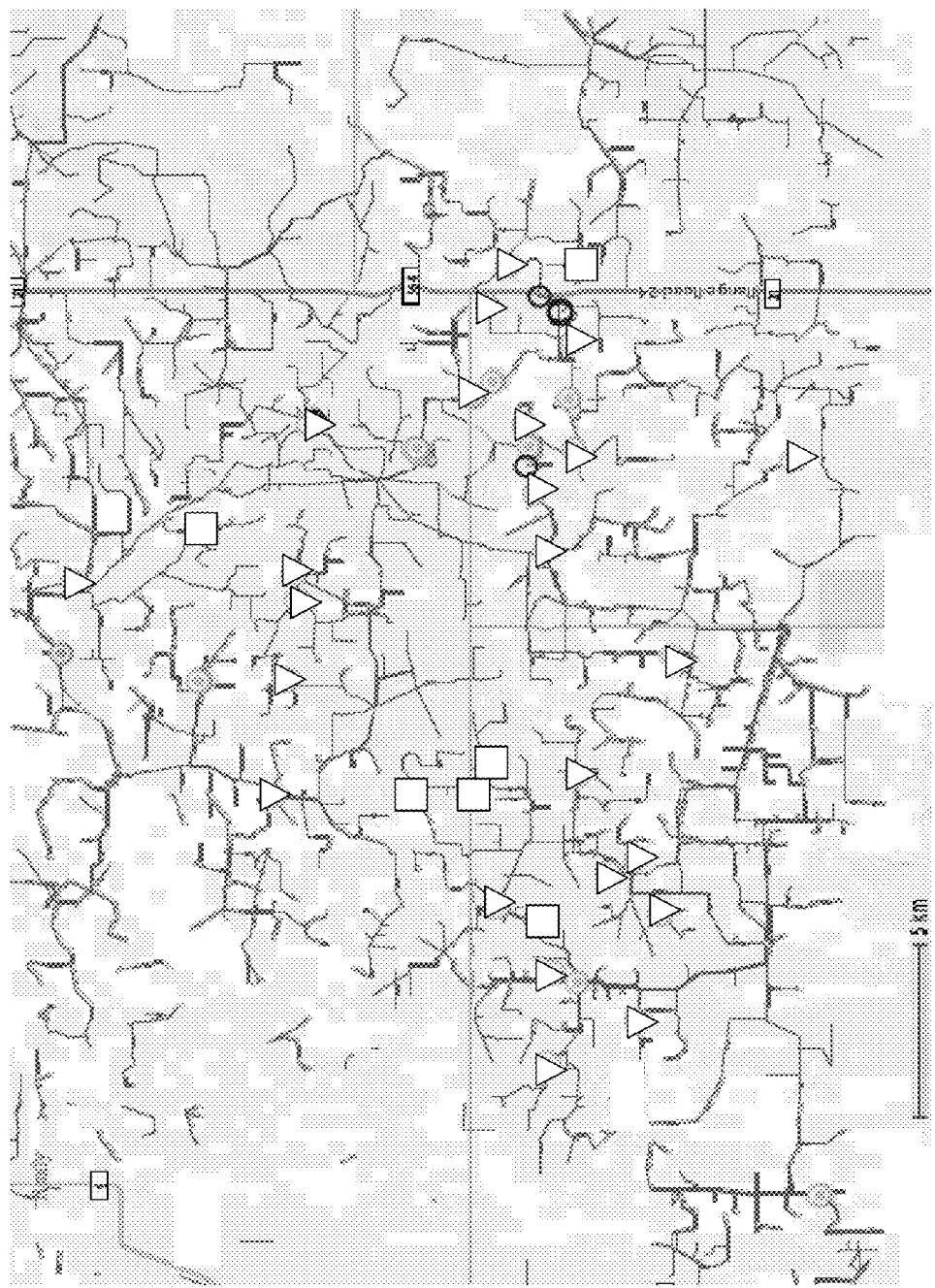
FIG. 7 illustrates a dynamic map having gas wells and gas pipe lines displayed thereon, the gas wells indicating various states of operation including flowing, at risk and frozen.
Figure 8:
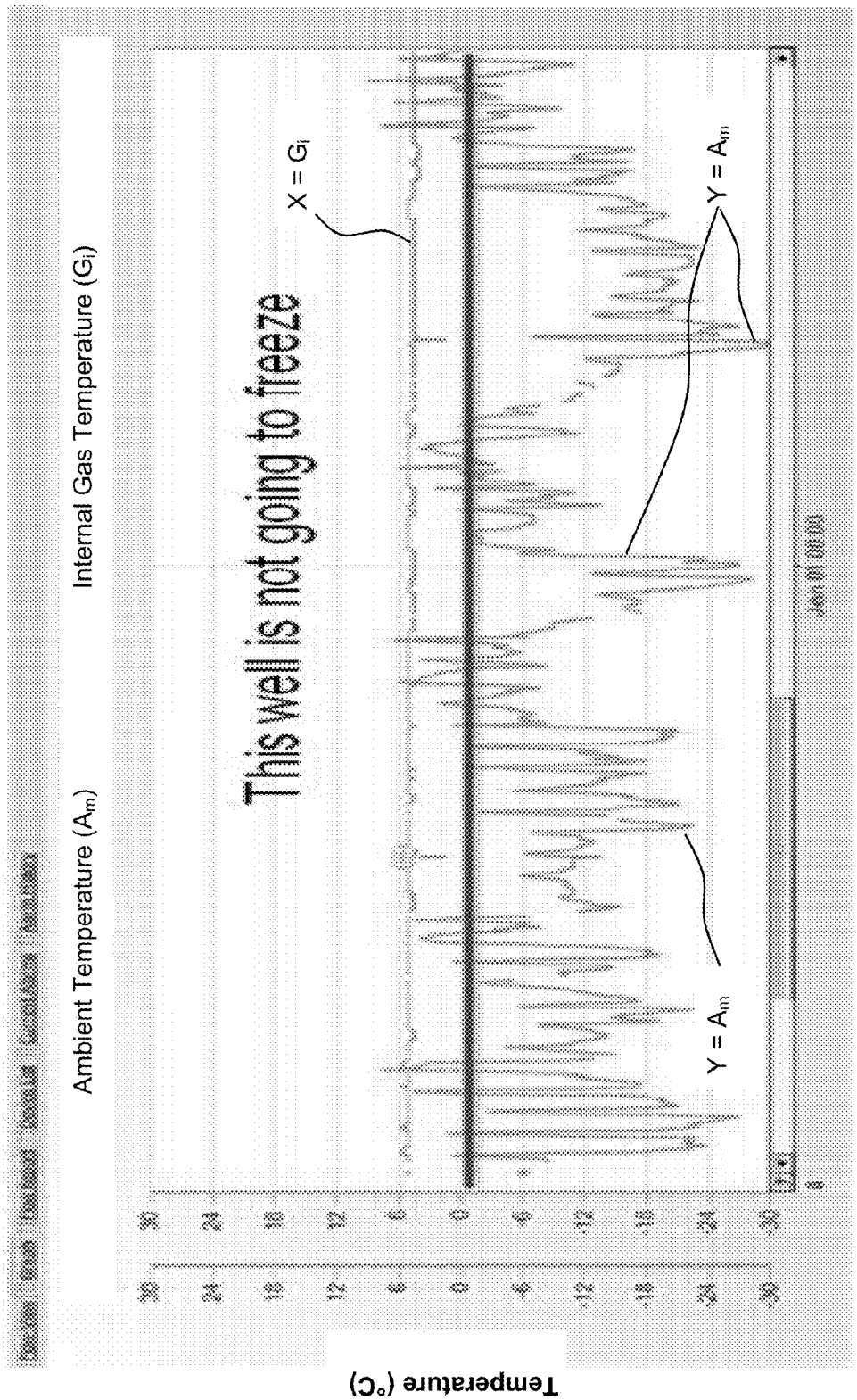
FIG. 8 is a time graph of the temperatures of gas from a gas well over time which is not likely to freeze.

In one embodiment, the processed information is correlated with the location of the wells using appropriate mapping data module or tools, such as that available from the Energy Resources Conservation Board (ERCB) in Alberta, Canada, and displayed in a format as shown in FIG. 7. The map in FIG. 7 shows gas wells and gas pipe lines. Circles with dots in the map, normally depicted as a green circle, indicate wells which are in a steady state and in no danger of freezing. This state is also indicated by FIG. 8. Shaded triangles, normally depicted as a yellow circle, indicate wells where Gi is trending towards Am. These wells are potential freeze off candidates and probably need investigation. Shaded squares, normally depicted as a red circle, indicate wells that are frozen. Through the substantially continuous transmission of well data to the remote processing unit 4, the map can be updated in substantially real time for best detection and timely response.

Thus, one assigns status flags for trending indicators comprising normal flag for normal flows, a risk flag for flows indicating a risk of flow anomalies, and a frozen wellhead. The status map is updated by illustrating each wellhead displayed thereon, fit with an embodiment described herein, for displaying normal, risk or frozen status flags for the wellhead.

This form of representation provides a radically different method for locating frozen wells as it pinpoints locations rather than relying on the indiscriminate guess work approach presently employed in the industry.

The system and method described herein allow producers to distinguish between wells that are going to freeze and those which are not and allow the producers to be proactive by treating wells which are about to freeze. This totally changes the method from reactive, hastily executed and indiscriminate approach to a proactive, planned over time and highly discriminating program. The result is higher production levels, lower costs and greater safety combined with an extremely attractive return on investment (ROI) for the producers. The technology allows producers to be knowledgeable and proactive about treating freeze offs.

Flow of gas in shallow wells during summer can also be monitored using the methodology and the system described herein. Flow of gas during summer can be interrupted due to various factors such as solar loading or liquid in the well which diminishes gas flow. Applicant has observed that during summer, one can determine when production decreases when the internal temperature of the gas (Gi) trends towards the ambient temperature (Am). The detection algorithm described above for detecting drop in production during winter can also be used in summer to detect diminishing gas flow.

Oil And Gas Embodiments

Figure 9:
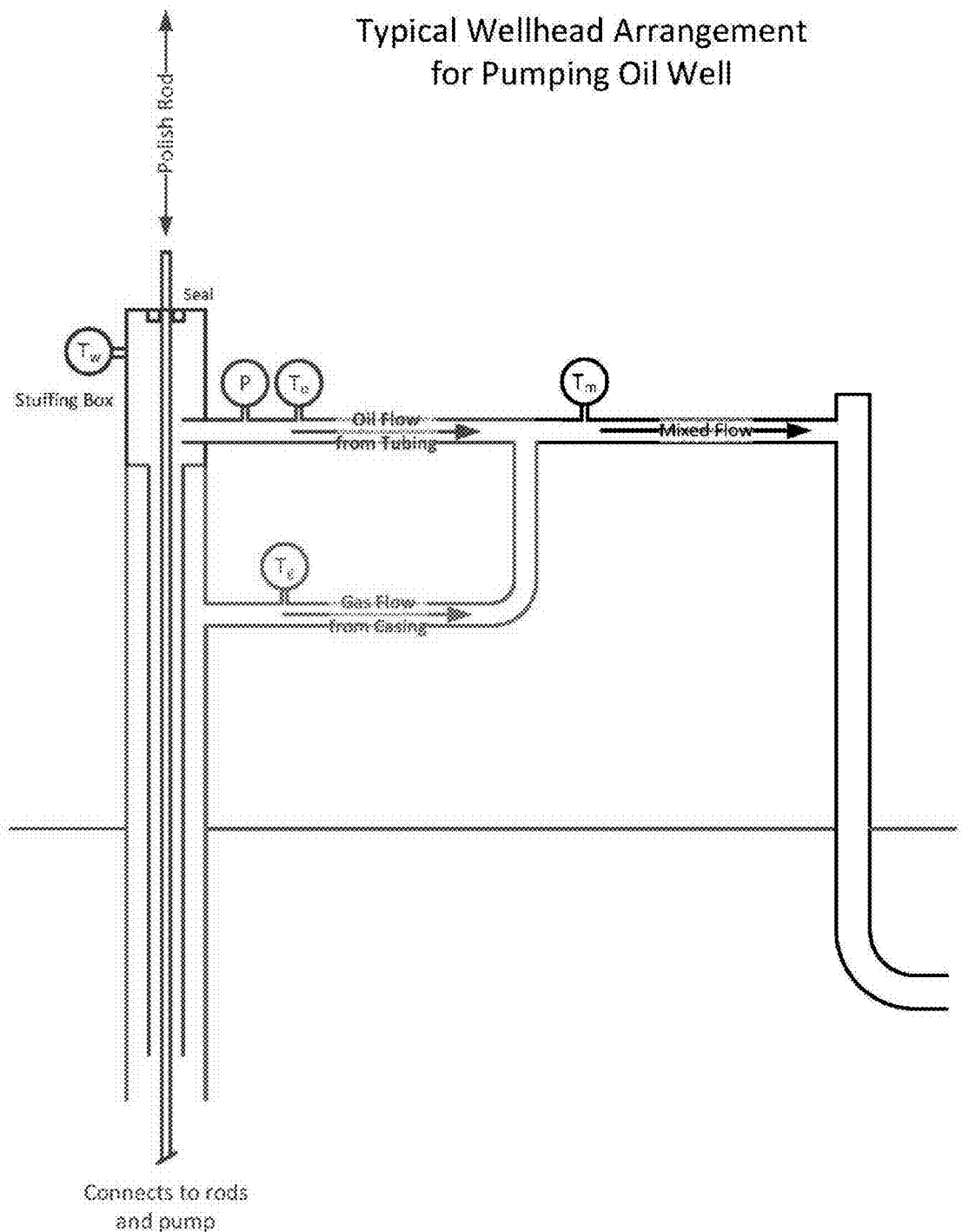
FIG. 9 is a cross-sectional view of simplified oil well wellhead having production tubing oil flow and gas flow from the tubing.

With reference to one common arrangement of a wellhead shown in FIG. 9, and turning to an oil well embodiment, oil wells commonly produce both gas and oil and water in widely varying ratios. As described above for gas wells, monitoring temperature of the flowing fluids over time provides useful indications of the health of an oil well wellhead even when the makeup of the fluid stream, and the flow regime, changes. Detection of low or no flow conditions in oil wells, is conducted through analysis of at least the temperature of several key aspects of the well. Early detection allows for timely repair, minimized downtime, maximizes production and minimizes damage or further damage to equipment. The flow identification works for all well types including free flowing, artificial lift, beam pumps, hydraulic pumps, submersible pumps, progressive cavity pumps, sucker rod, and corod for example.

Flowing temperature can be sensed inside the wellhead flow piping. Flowing temperatures can also be monitored using an external temperature sensor strapped to outside of the piping, typically using some degree of insulation to make the sensor more reactive to the piping (See FIG. 22). Temperature sensors can be positioned to monitor oil flow To, gas flow Tg, or mixed flow Tm. Temperature sensors can be positioned inside the pipe, or on the outside pipe wall.

Pressure signals can also be useful, annulus pressure having generally a closer correspondence with tubing flow. Pressure sensor monitors flowing pressure and pressure cycles from pumping. In pumping arrangements, wellhead temperature is typically measured at a pump's stuffing box.

Again, as in the gas embodiment, a reduction or loss of fluid flow due to freezing can be indicated by one or a combination of measured characteristics. Scenarios include a trending of flowing temperature moving downwards towards ambient, say 0° C., flowing temperature correlating too closely with ambient; and wellhead temperature correlating too closely with ambient.

Further, one can monitor a change in pattern of the temperatures and/or pressure trend including intermittent flow which causes cycling of the monitored signals. Characteristic of oil wells which are being pumped, such as through mechanical pumping apparatus extending down hole, is interaction of the moving parts and the wellhead. In both reciprocating and rotary pumping applications, a polish rod passes through the wellhead and is sealed at a stuffing box of sorts. The seal interface is associated with friction and localized heating. Such heating is typically mitigated and cooled by the flowing stream of oil up the tubing and out of the wellhead. Thus, a reduction of oil flow, for one reason or another, results in wellhead temperature rising above normal.

Further, a reduction in cyclic pressure levels can be monitored as indicative of equipment failure or no oil being pumped despite continued pump operation. Similarly, an increase in cyclic pressure levels suggests a downstream restriction or blockage.

Notification of such problems can be remote from web server including via electronic messaging (such as email), a mapping module accessible by operators on an intranet or distributed network or locally at the wellsite using indicator lights, cell phone, wireless data message from processor itself.

Figure 10A:
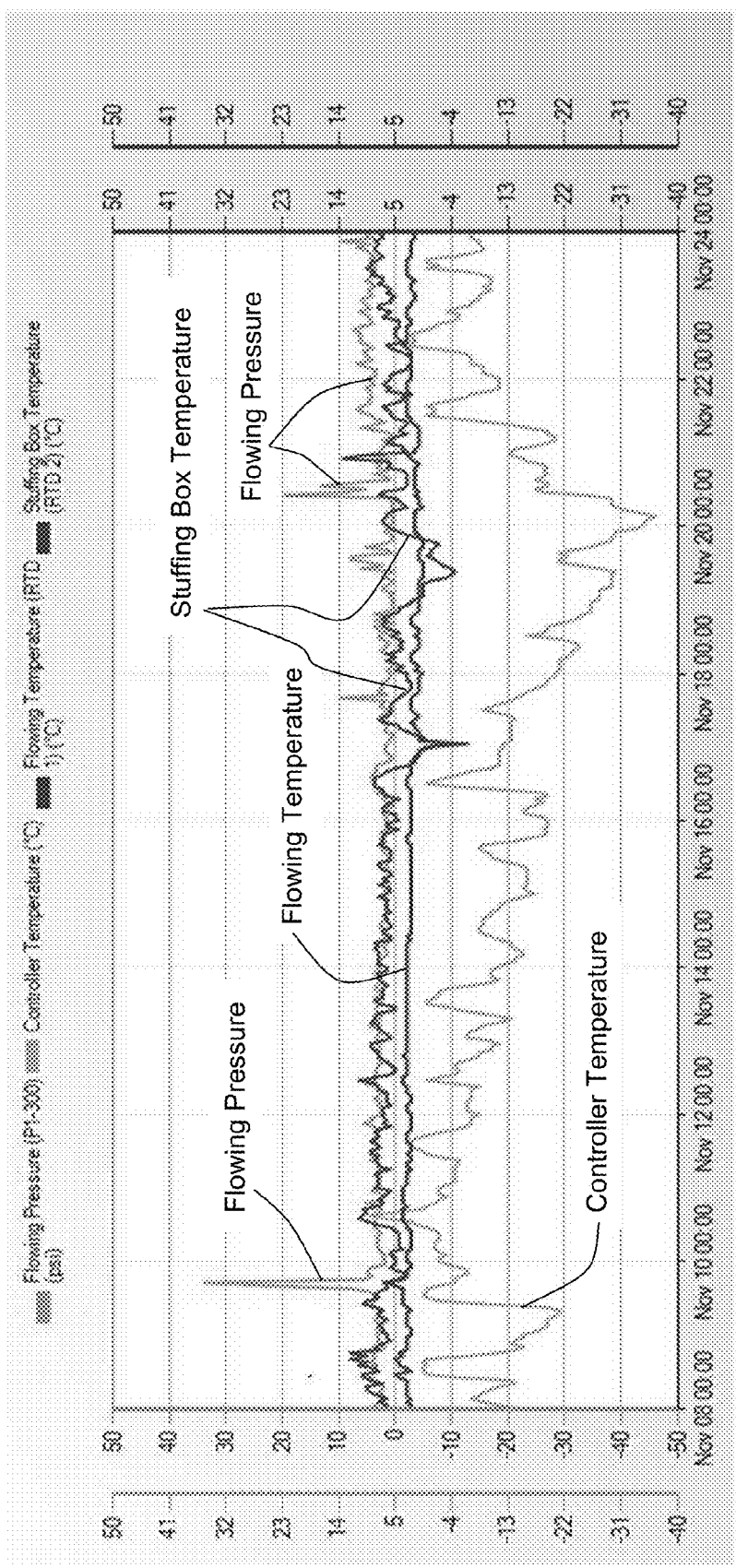
FIG. 10A is a time graph of the temperatures and pressures of a 16 day period of relative normal operation of an oil well.
Figure 10B:
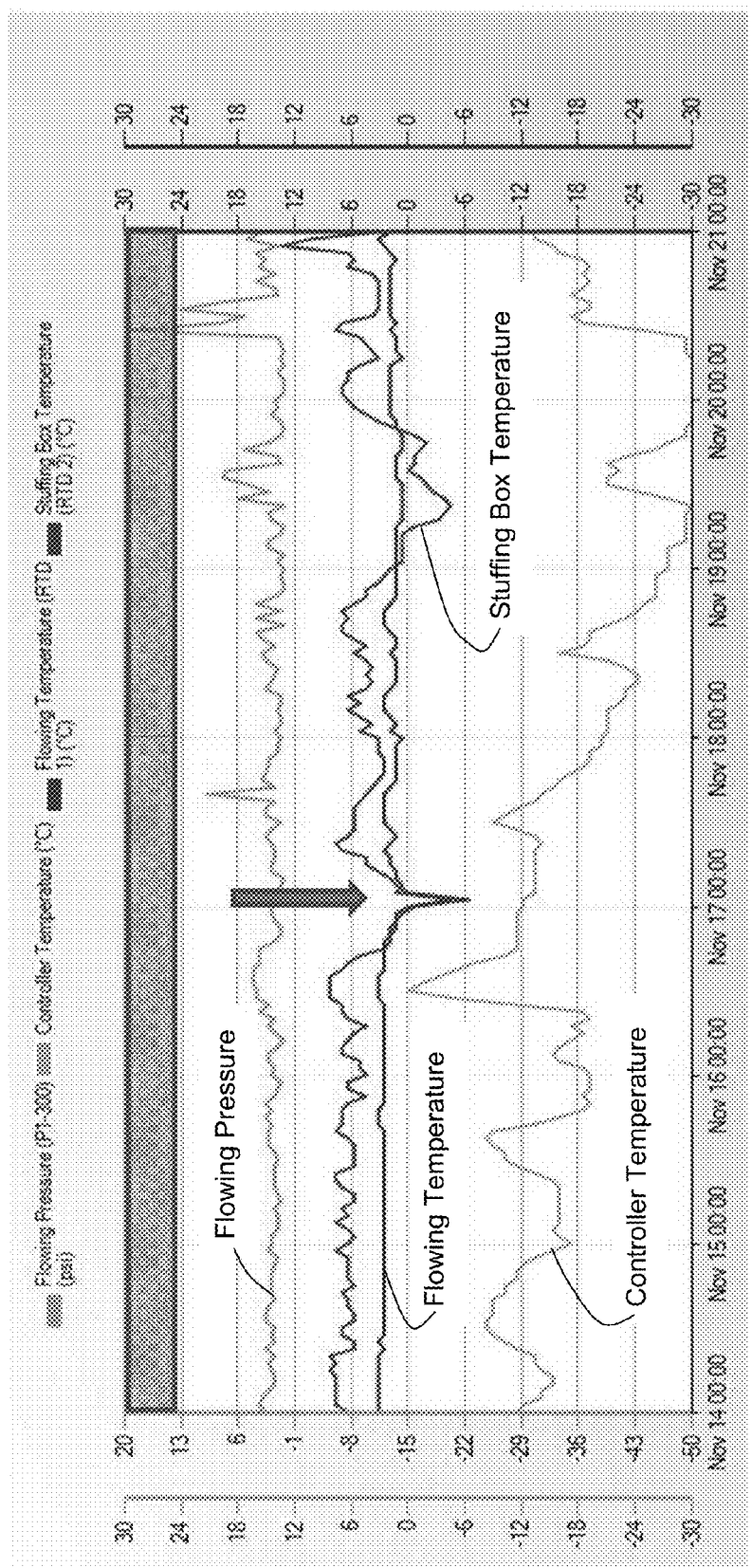
FIG. 10B is a close up of a flow interruption highlighted on November 17 of the operations of FIG. 10A.

With reference to FIG. 10A, a relatively normal flow operation is illustrated with one interruption in flow on November 17 indicated by both a drop in flowing temperature and stuffing box temperature. The drop is illustrated more clearly in a close up of the period of interruption on FIG. 10B.

Figure 11:
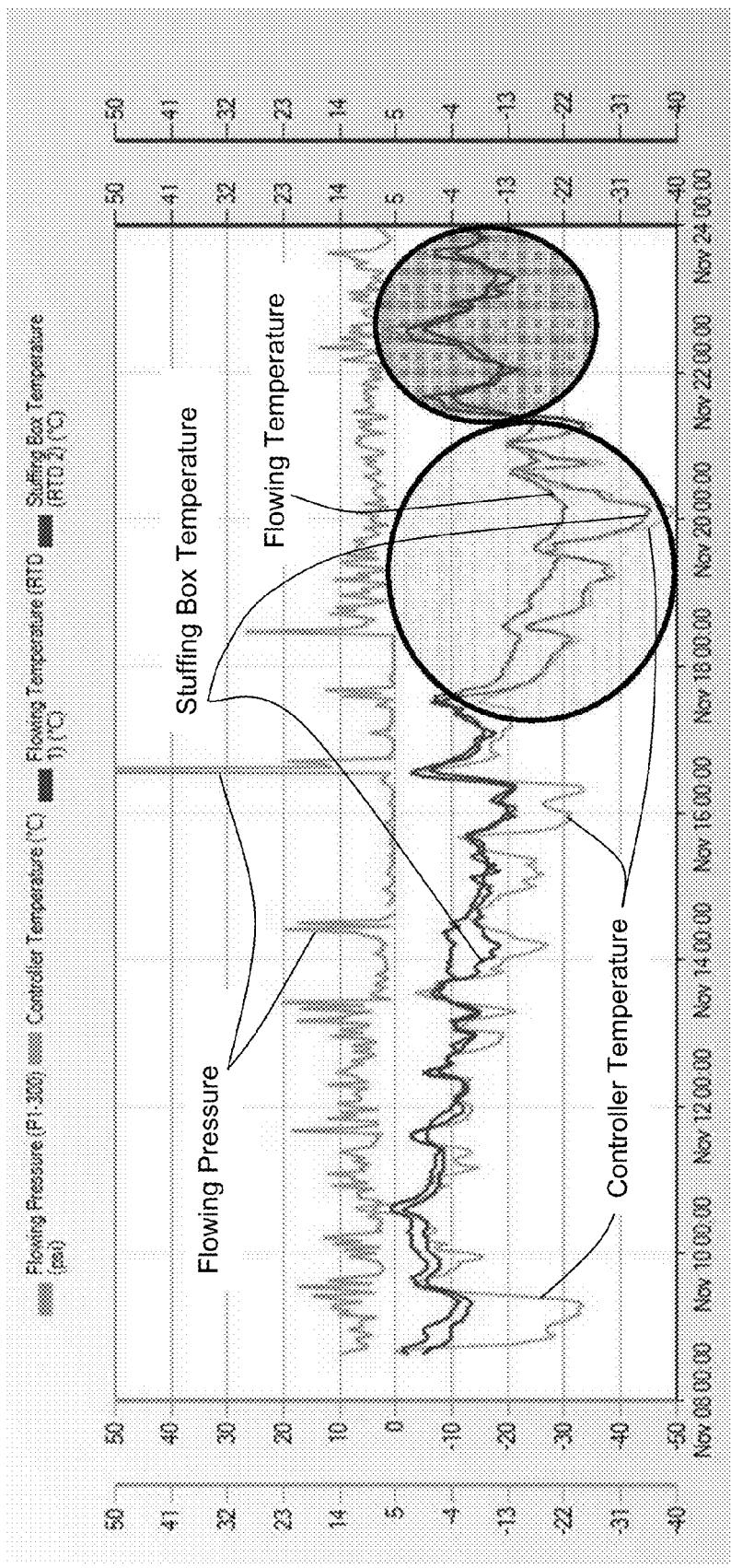
FIG. 11 is a time graph of the temperatures and pressures of a 16 day period of operation of an oil well with a general trending to freeze off.

With reference to FIG. 11, monitored conditions are shown with a partial reduction in flow and a complete stoppage, the portion at November 20 illustrating a cessation of oil with some gas flow from the annulus. The wellhead temperature has trended to ambient, while flowing temperature, of the oil, is still warmer than ambient. At November 22, both flowing temperatures and wellhead temperatures have trended to ambient indicating no flow of either oil or gas.

Figure 12:
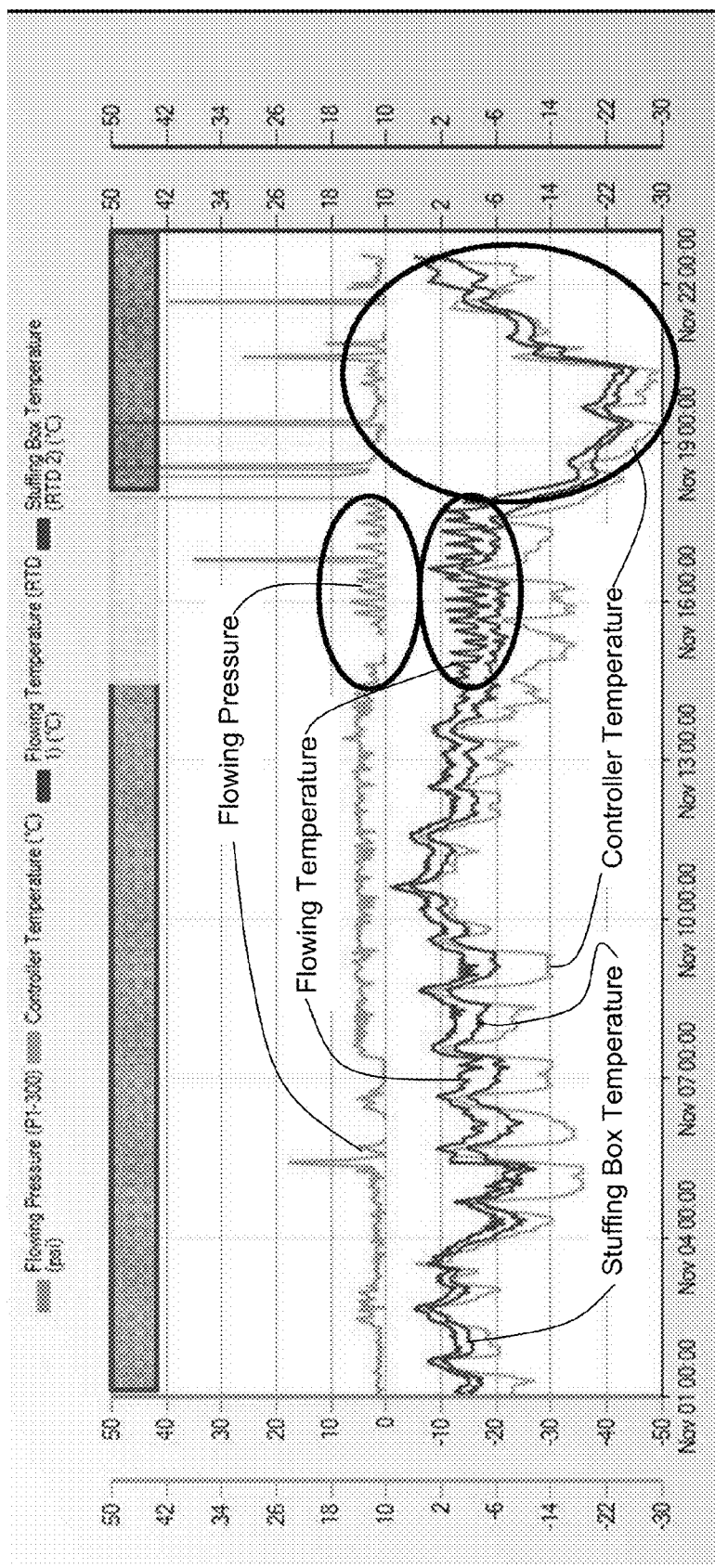
FIG. 12 is a time graph of the temperatures and pressures of a 16 day period of operation of an oil well demonstrating intermittent flow to freeze off.

With reference to FIG. 12, monitored conditions are shown with a 13 days of normal flowing operations and thereafter intermittent flow to freeze off. On November 14, flowing temperature and wellhead temperatures are intermittently tracking ambient indicating developing problems. At November 18, temperatures plummet to correlate with ambient indicating cessation of flow with neither flow of oil nor gas.

Assessment of flow characteristics for an oil well, compared to a gas well, have at least the following competing factors: the volumetric flow rates from gas wells are typically much greater than that of oil, however the heat capacity and conduction from the flow of gas to the wellhead is less effective than that for oil, negatively affecting the sensitivity of temperature measurement. Further, the freeze off for gas wells is typically at about 0° C. while oil is more aligned with sub-zero ambient temperatures. Hence, the failure point for oil flows varies and may be more akin to a chill-off point.

Note that while the examples are discussed in the context of cessation of flow due to cold ambient temperatures, they can also apply as warnings for a host of partial or complete failures such as gradual pump failures, watering off, leaks or rupture in the production tubing, some form of interference with the flow of production fluids such as sand, scale, or paraffin at the wellbore.

Hence, in another embodiment, determination of oil well freeze-off is aided by inspection of the difference between actual flow temperatures and normal flow temperatures for given ambient temperatures.

Figure 13A:
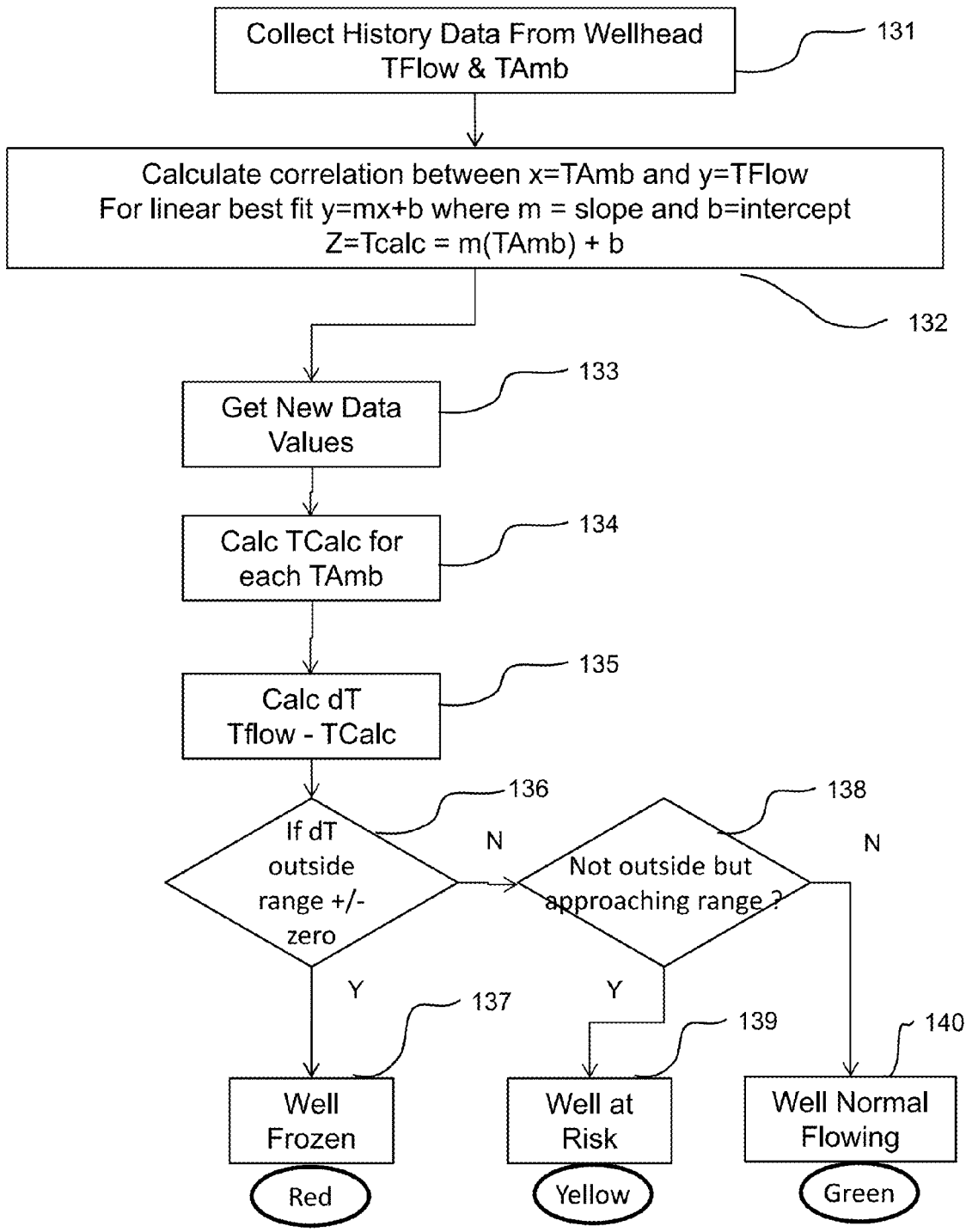
FIG. 13A is a flow chart of one embodiment of the steps to identify flow anomalies.

Briefly, with reference to FIG. 13A, in an oil well scenario, at Block 131, data is collected during normal flow operations, establishing a relationship of flowing temperatures, for that wellhead, for the recent experience of ambient temperatures. The duration of history data required can vary from several days to several months depending on the degree of correlation of the two temperatures at various times. This degree of correlation is influenced primarily by the volumetric flowrate of the fluids, but secondarily by the composition of the flowing fluid stream (oil/water/gas), by environmental conditions such as season, sunlight, humidity, wind, by specific sensor installation details (pipe size, sensor size, thermal coupling, insulation), and data collection techniques such as sampling rate, averaging. At block 132, a relationship, such as a linear relationship from linear regression techniques, is calculated for predicting a normal flow temperature for a given ambient temperature. In a linear relationship slope M and intercept b are obtained for y=mX+b, where X is the ambient temperature and Y is the measured flow temperatures. Simplistically, going forward from the sample data, if actual measured flow temperature varies from the predicted flow temperature, then there could be an anomaly in the flow conditions.

The relationship can be more sophisticated, as described later, to accommodate for various other factors and sensitivities.

A block 133, once the relationship is known, ongoing data is obtained for the well. The data is likely streamed for analysing the health of the well on an ongoing basis. At block 134, measured ambient temperatures TAmb, as the controlling temperature X, is processed through the normal flow relationship for predicting a calculated flowing temperature TCalc if the well is normal. As the relationship is an approximation, and many factors can affect the a direct linear relationship, including rate of change of ambient temperatures and nature of the flowing fluid, a predicted flow temperatures will not exactly match the actual, even during normal flow, or even the sample data reprocessed through the relationship. Hence, the match of actual to predicted flow temperature is compared within a range.

At block 135, a differential temperature is calculated between the actual and predicted flow temperatures at each measured ambient temperature over time.

When this differential temperature dT is about zero or close thereto, the well is flowing completely normally, as indicated by past measurement. At block 136, the differential temperature dT is compared to a range either side of zero, the further from zero, the more suspect, although the quantum of the variation from zero may not be arithmetic. The magnitude of dT and whether dT is inside or outside the chosen range is calculated. At block 137, if the differential temperature dT is outside the chosen range, the well is frozen or otherwise has stopped flowing.

At block 138, if the differential temperature dT is within the range, further calculation determine how closely dT deviates from zero, and if dT is approaching the range limits. At block 139, if the differential temperature dT is approaching the range limits, the well is at high risk of freezing or stopping flowing. At block 140, if the dT is within the range and close to the ideal zero datum, the well is normal and flowing, at no risk of freezing.

Figure 13B:
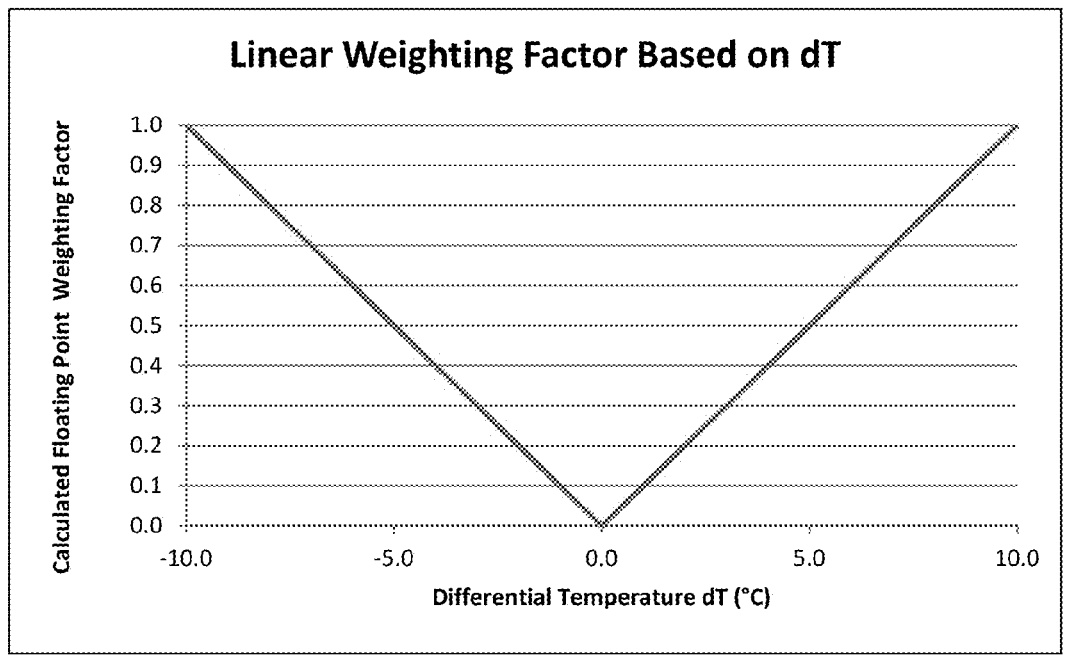
FIG. 13B is a graph of linear weighting factors as applied to the difference between calculated and actual flow temperatures.
Figure 13C:
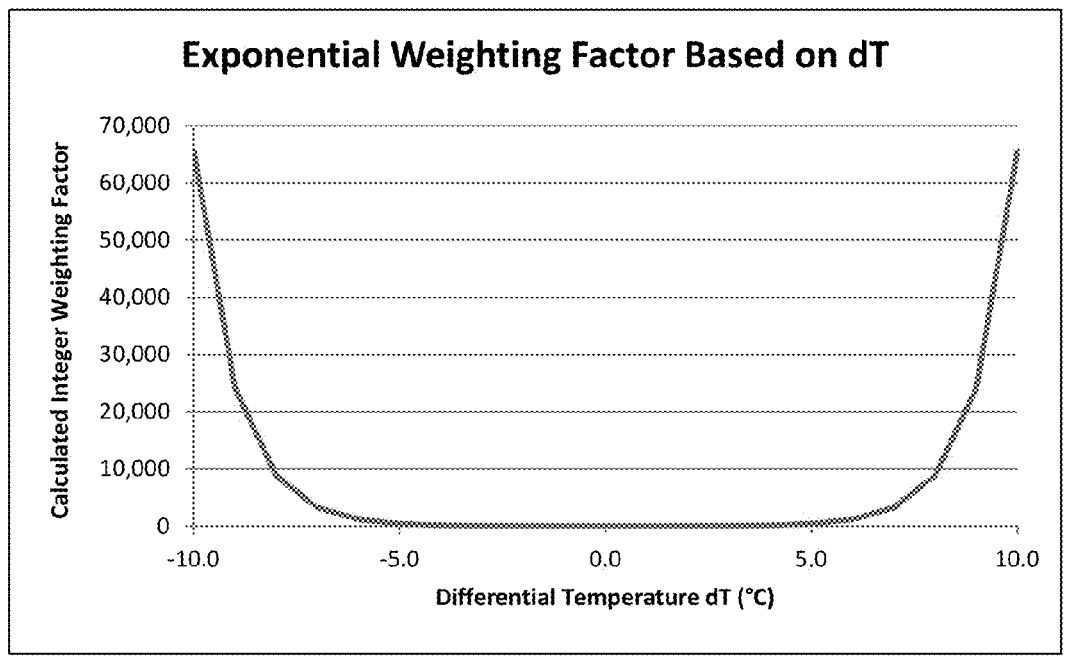
FIG. 13C is a graph of exponential weighting factors as applied to the difference between calculated and actual flow temperatures, and as the difference exceeds +/−5 C.

With reference to FIG. 13B, a weighting factor can be calculated which increases as differential temperature dT moves away from zero and towards the assigned range limit. In the case of FIG. 13B, the weighting factor is linear and ranges from 0.0 to 1.0, but many other types of calculations can be incorporated as well. With reference to FIG. 13C, one can calculate non-linear, such as exponential or other weighting factors, with other integer or floating point numeric ranges to adjust the effect for each data point as dT increases, nearing the range limit. Thus, as the differential temperature dT approaches the range limit, the effect of the temperature difference values approaching the range or error bounds is accentuated, being more likely indicative of the flow as being at risk or being frozen.

Figure 13D:
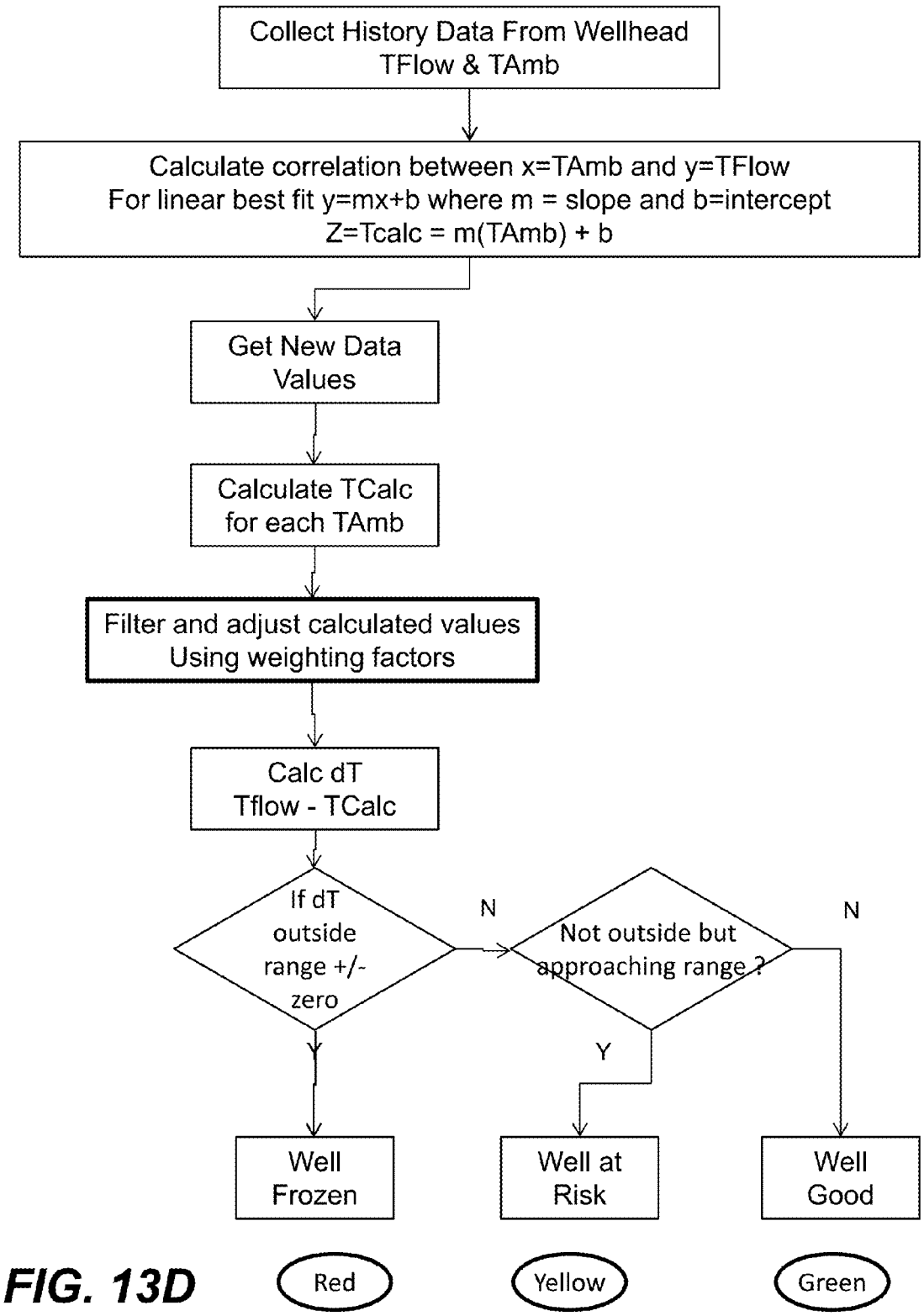
FIG. 13D is a flow chart of another embodiment of the steps to identify flow anomalies including weighting factors.

With reference to FIG. 13D, the normal flow relationship which is to be calculated between ambient temperature TAmb and flowing temperature TFlow can be modified to account for the calculated weighting factors. Using these weighting factors improves the correlation between these measured parameters, by applying higher weighting to the values where the differential temperature dT is near zero, and applying lower weighting to the values where the differential temperature dT is near the range limits.

Figure 14:
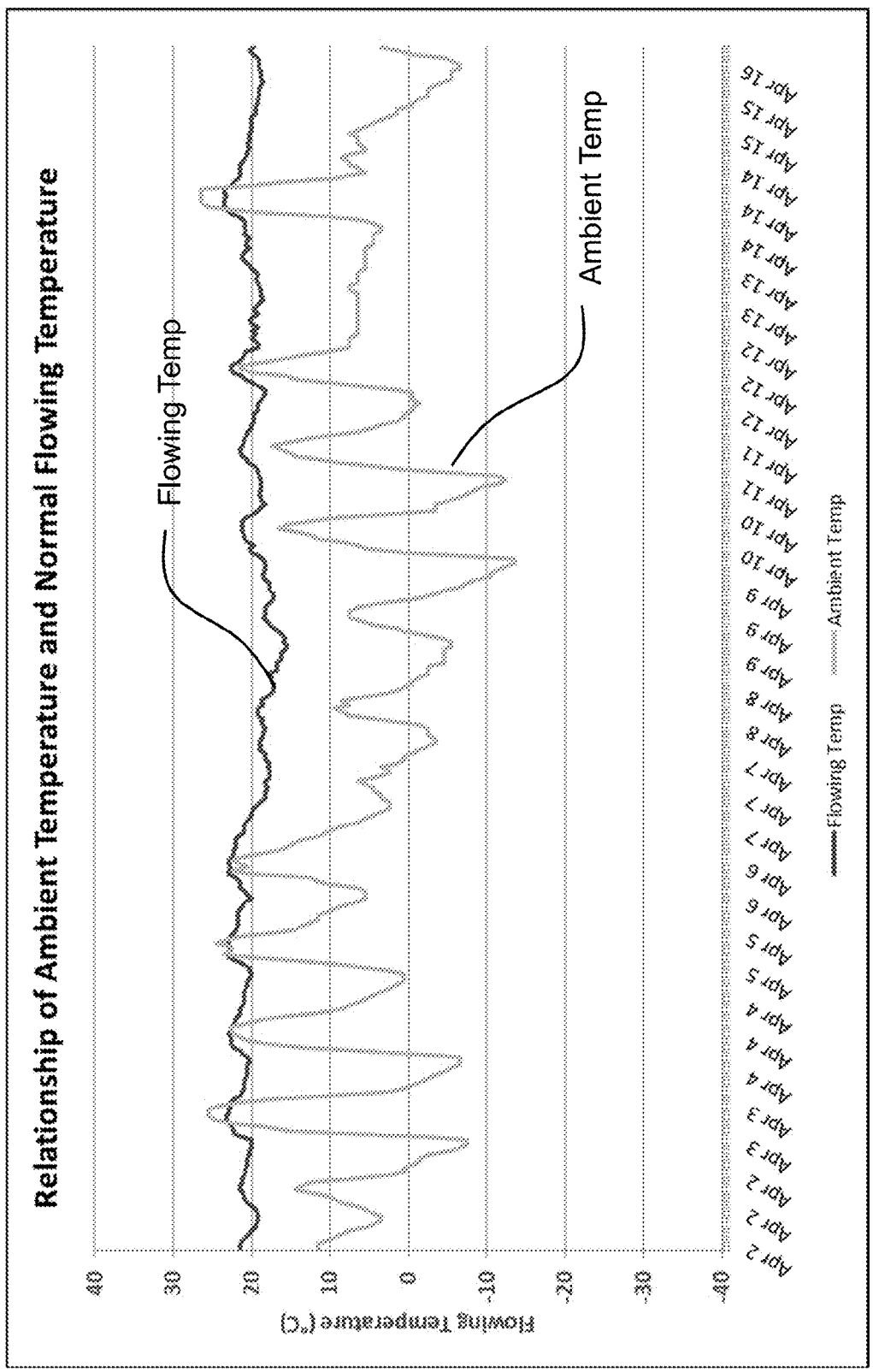
FIG. 14 is a graph of the relationship of ambient temperature and normal flowing temperatures, ambient oscillating between about −13 C and 26 C.

With reference to some sample data, and as shown in FIG. 14, normal flowing temperatures TFlow of the oil flow from an oil well is illustrated, with a weak response of the oil flow temperature TFlow compared to the ambient temperature TAmb, sharp drops in ambient TAmb reflected by small changes in flowing temperature TFlow. In an embodiment, a sampling of 100 to 1,000 data points for normal flow are obtained for a starting relationship of ambient and normal flow temperatures.

Figure 15:
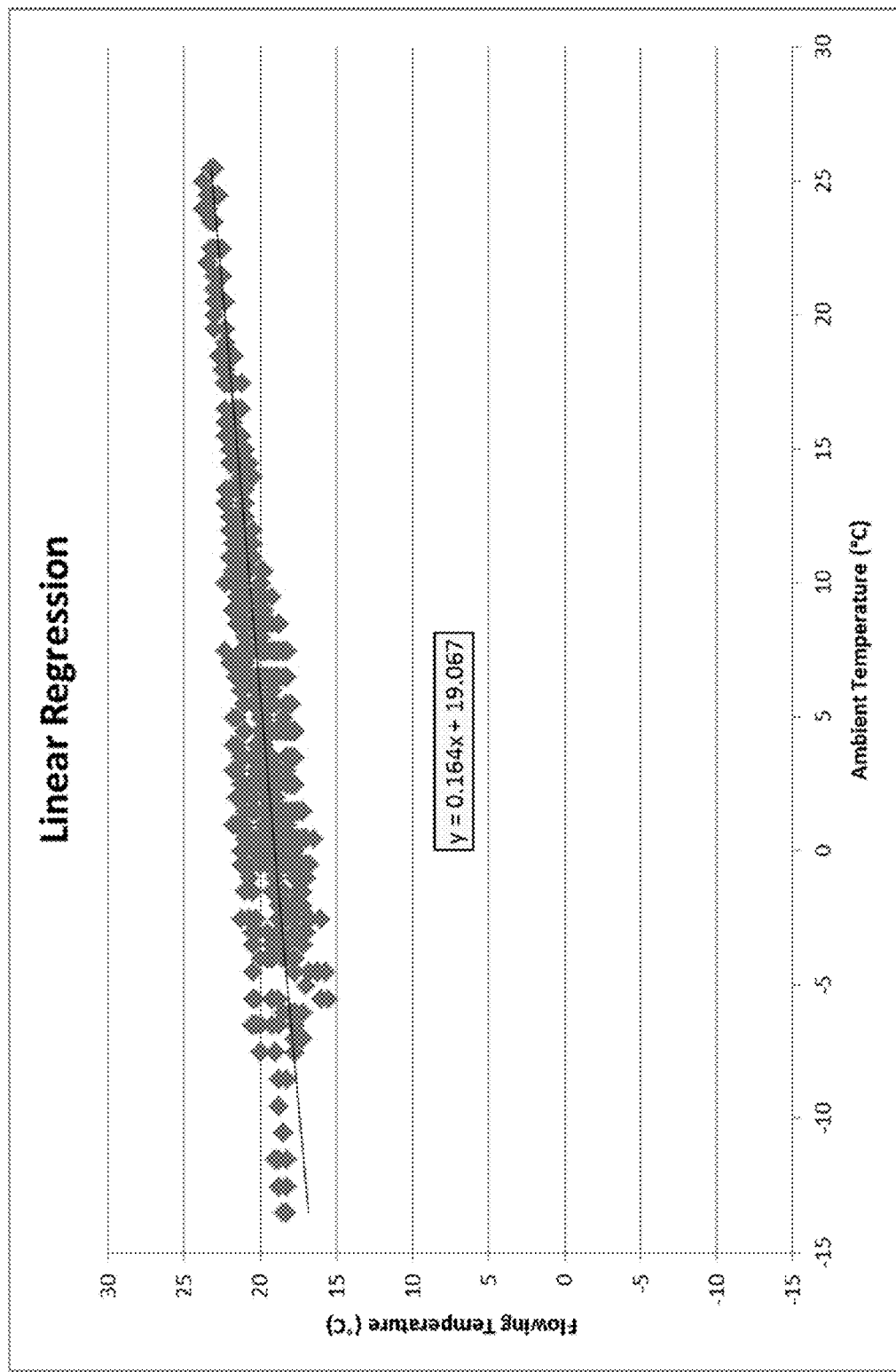
FIG. 15 is a graph illustrating a linear best fit correlation between ambient temperatures and flow temperature.
Figure 16:
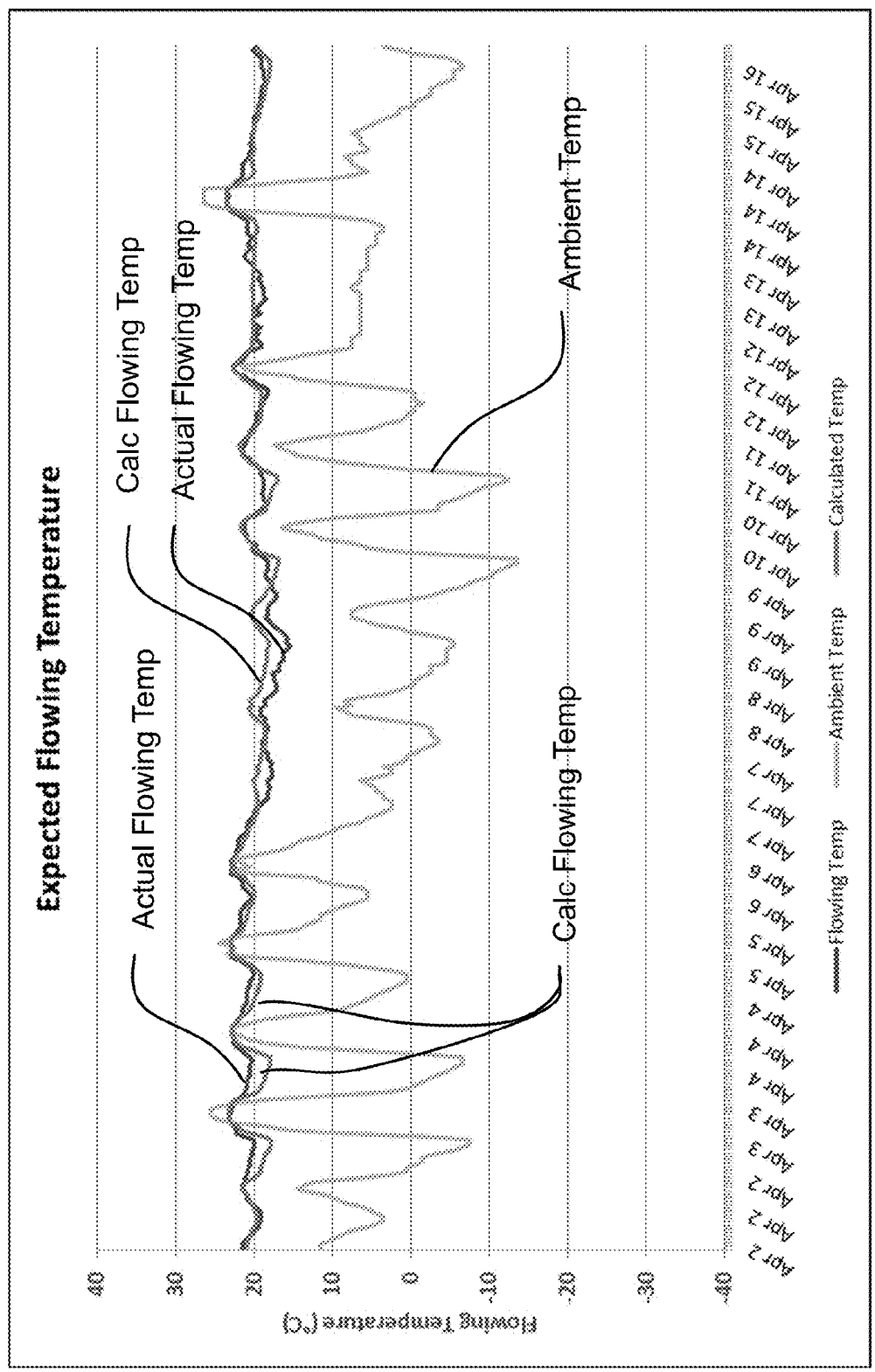
FIG. 16 is a graph illustrating the graph of FIG. 14, with a curve for predicted or calculated normal flow temperatures for the controlling ambient temperature, the actual and calculated flow temperatures nearly superimposed.

With reference FIG. 15, a relationship is obtained, such as a linear regression of the data points, so as to establish a normal flowing temperature for the independent variable of ambient temperature TAmb. Hence, going forward, as ambient temperatures TAmb varies, one can determine an expected normal flowing temperature TCalc. The veracity of the example linear relationship is illustrated in FIG. 16 in which actual flowing temperatures of FIG. 13 are compared with the calculated flowing temperatures.

Figure 17:
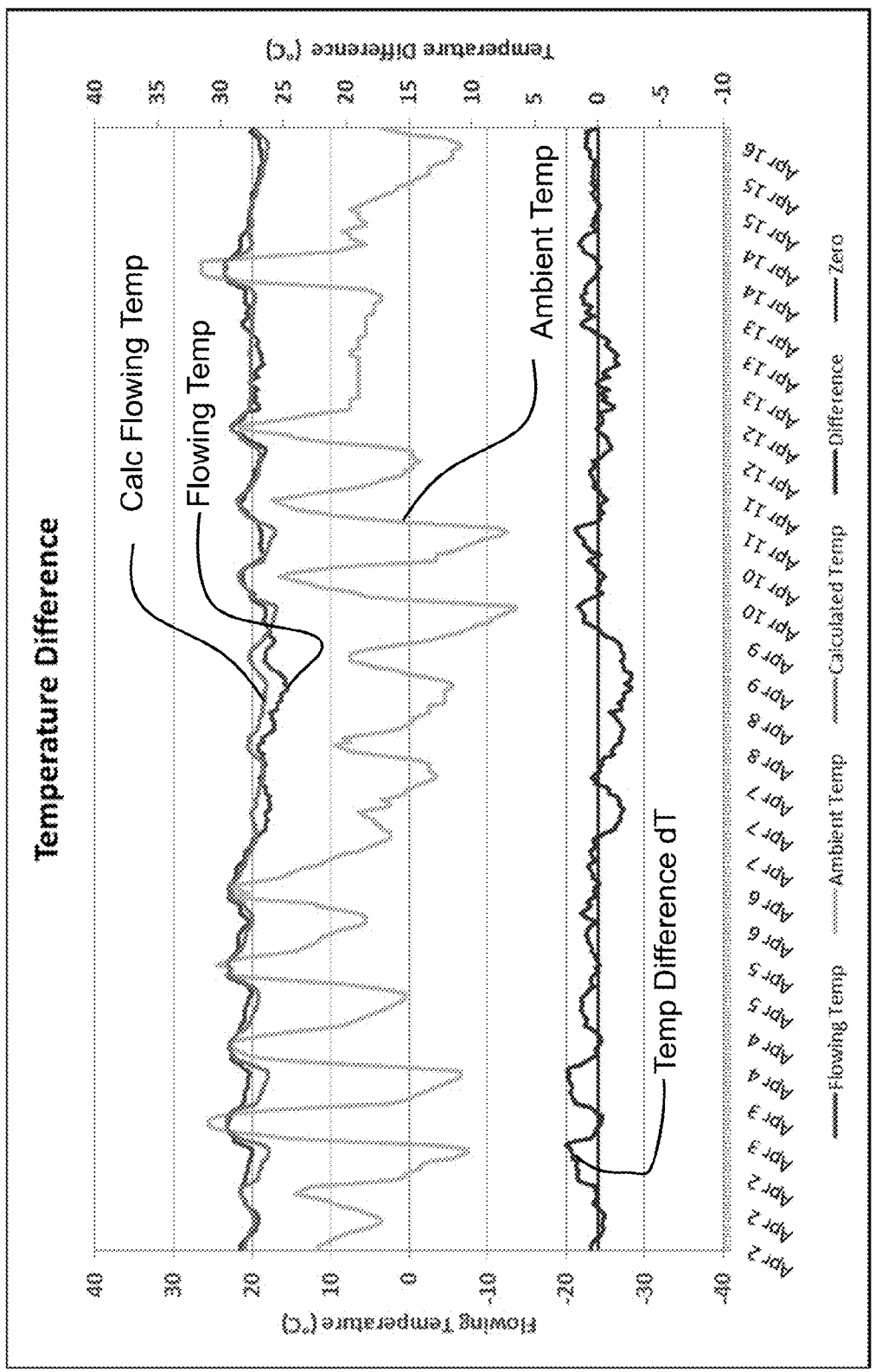
FIG. 17 is a graph according to FIG. 16 with the difference dT between the actual and calculated flow temperatures shown about a zero or ideal base line.

With reference to FIG. 17, a temperature difference between actual and calculated temperatures is determined which, for the normal data points, should track about zero. Hence, variation from zero indicates a flowing temperature that has left the normal relationship determined for that wellhead. As the example linear relationship is not very sophisticated, there is some variation from zero, even with normal flow.

Figure 18:
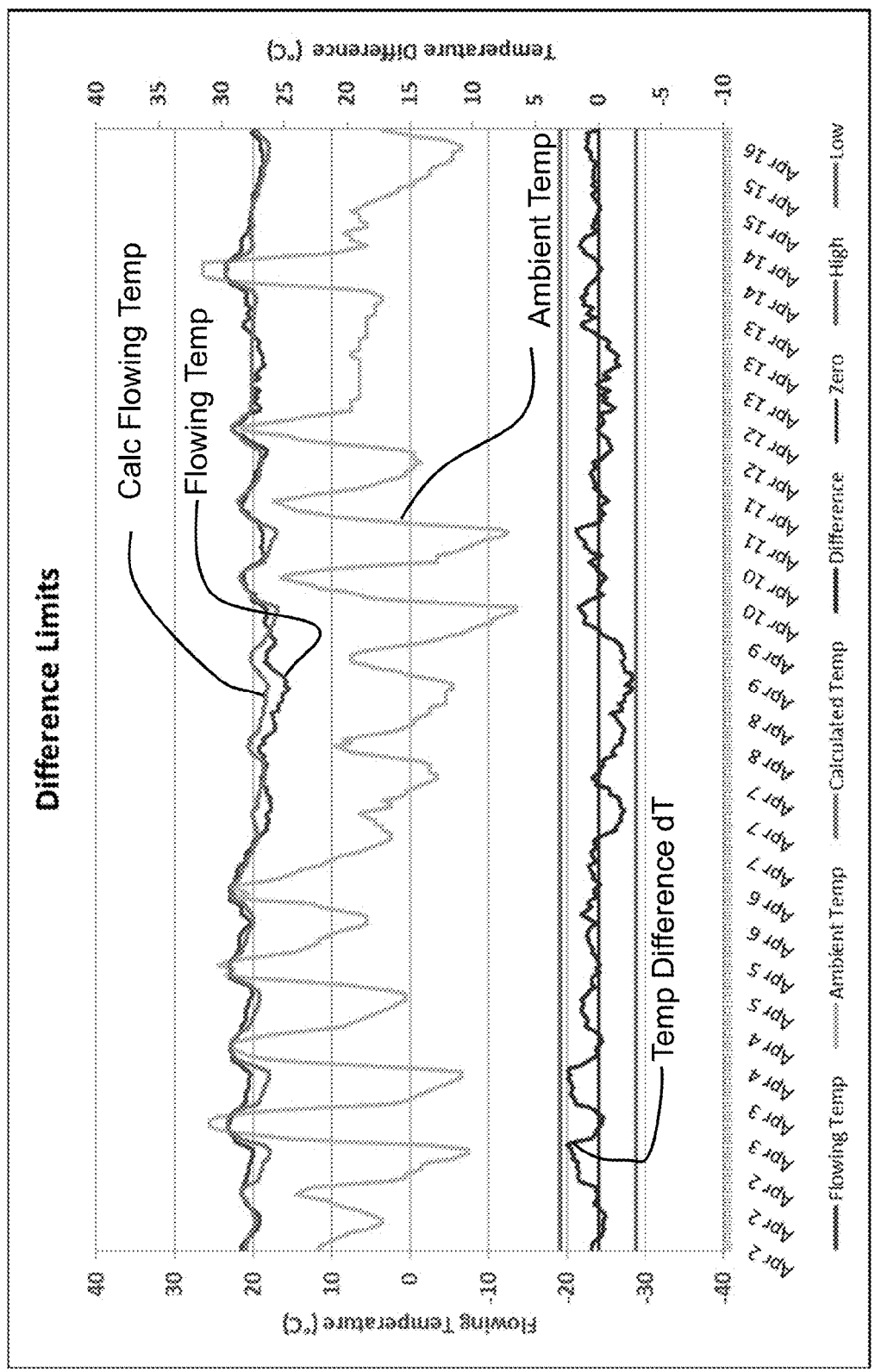
FIG. 18 is a graph according to FIG. 17 with range limits or bounds added about the dT zero base line to provide a threshold for indicating a well at risk of flow stoppage.

With reference to FIG. 18, so as to aid in distinguishing normal flow using the values for temperature difference, one can establish range limits or difference bounds about the zero relationship. Often non-zero temperature differences occur with normal flow but will generally remain within the difference bounds. Those temperature difference values approaching and falling outside the difference bounds can be indicative of a risk of no flow and no flow. As shown, difference bounds have been set at plus and minus 3° C., variation of the temperature difference value all falling within the bounds and in no case was the wellhead at risk of no flow.

Figure 19:
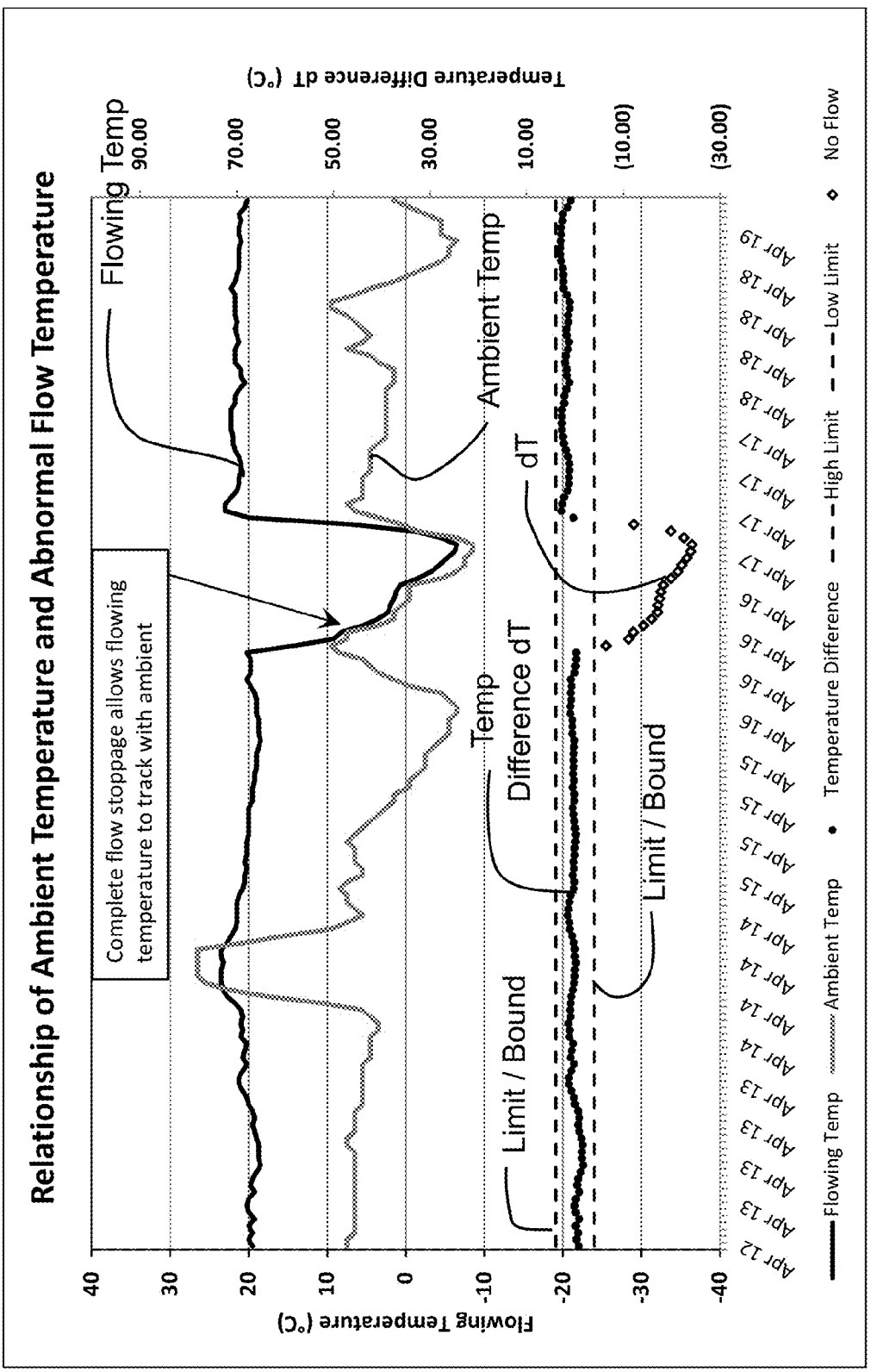
FIG. 19 is a graph according to FIG. 18 moved forward in time from normal operation to an identified event, the dT having fallen well outside of the bounds and indicating a well experiencing flow stoppage.

As shown in FIG. 19, in a clear example, as flow temperatures falls to ambient, flow has stopped. However, even prior to no flow, one can use the temperature difference, falling outside well outside the difference bounds, as the indicator of impending freeze off, permitting an alert and preventative action.

Figure 20:
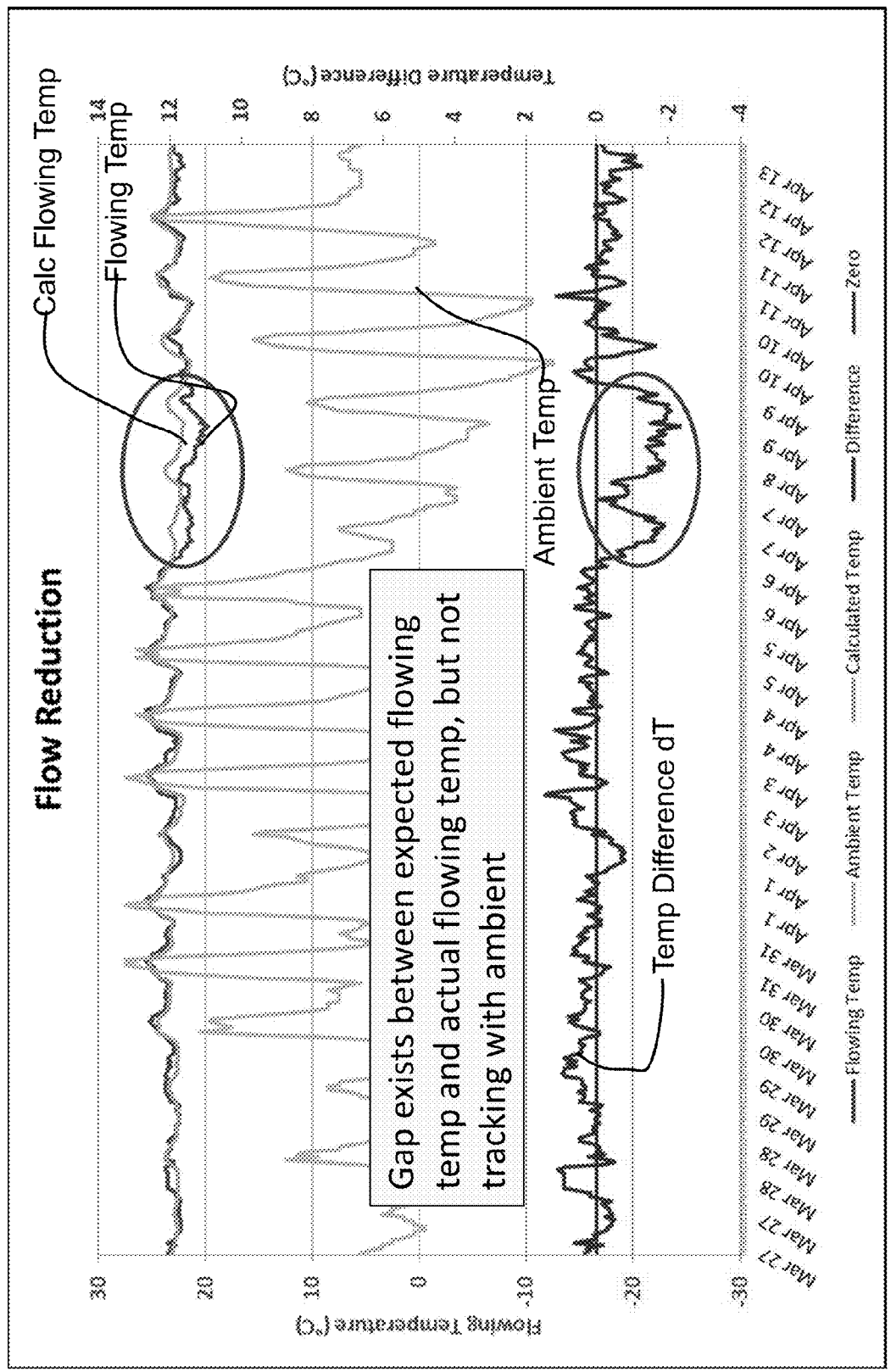
FIG. 20 is a graph illustrating trending behaviour which could be at risk, or related to other operating parameters.

Temperature difference bounds can also be used to temper the predicted indications which are the effect of flow variations rather than problems with the wellhead. For example, and with reference to FIG. 20, at day 7 through 10, despite very low ambient temperatures, a higher than typical opportunity for freeze-off, and with a drop in the determined temperature difference, the lower actual flow temperatures really were only indicative of a decrease in flow rate unrelated to a problem with the well or wellhead.

This same variance in temperature difference dT can be used to predict flow interruptions based on trending this series of points over time. As the trend of dT moves towards the defined range limits, forecasting methods can be used to generate an exception status even before the actual limit is reached. This forecasting can include a variety of mathematical techniques such as extrapolating the slope of the trend line, integration of the area under the curve, which represents the total amount of abnormal flow condition, or calculating and applying tighter range limits for short intervals of time to determine a succession of intervals where the flow is judged to be normal or abnormal.

Figure 21:
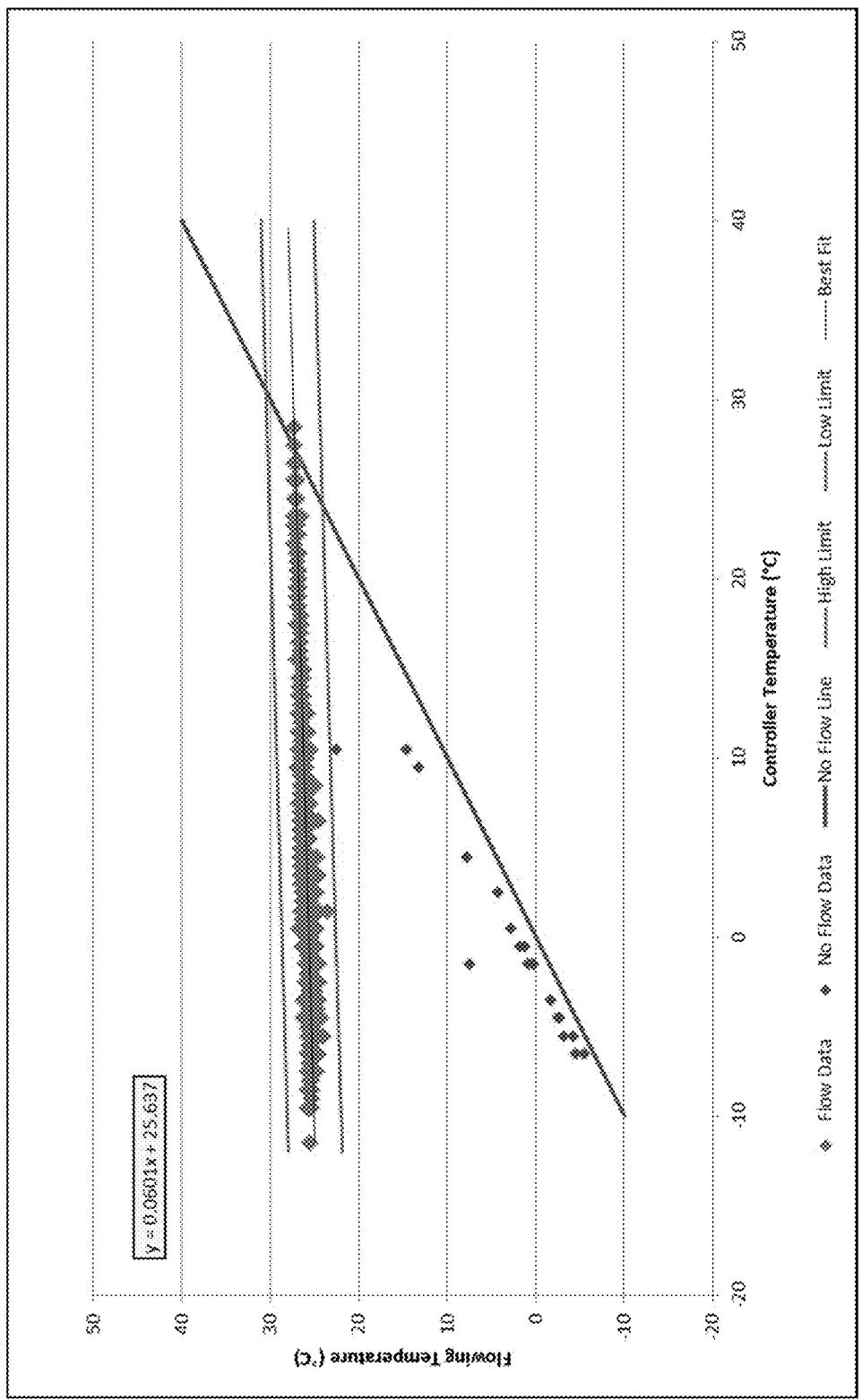
FIG. 21 illustrates the case of identifying no flow scenarios with an identify function of ambient temperature and flow temperature.

As shown in FIG. 21, a 1:1 relationship or identify function is shown for he the correlation between ambient temperature TAmb and flowing temperature TFlow when the well is not producing at all. Thus for any given ambient temperature, if there is no flow, the flowing temperature will equal the ambient temperature. Data points which fall outside the defined limit boundaries, and in particular close to this 1:1 relationship are indication that there is no flow at the well.

Figure 22:
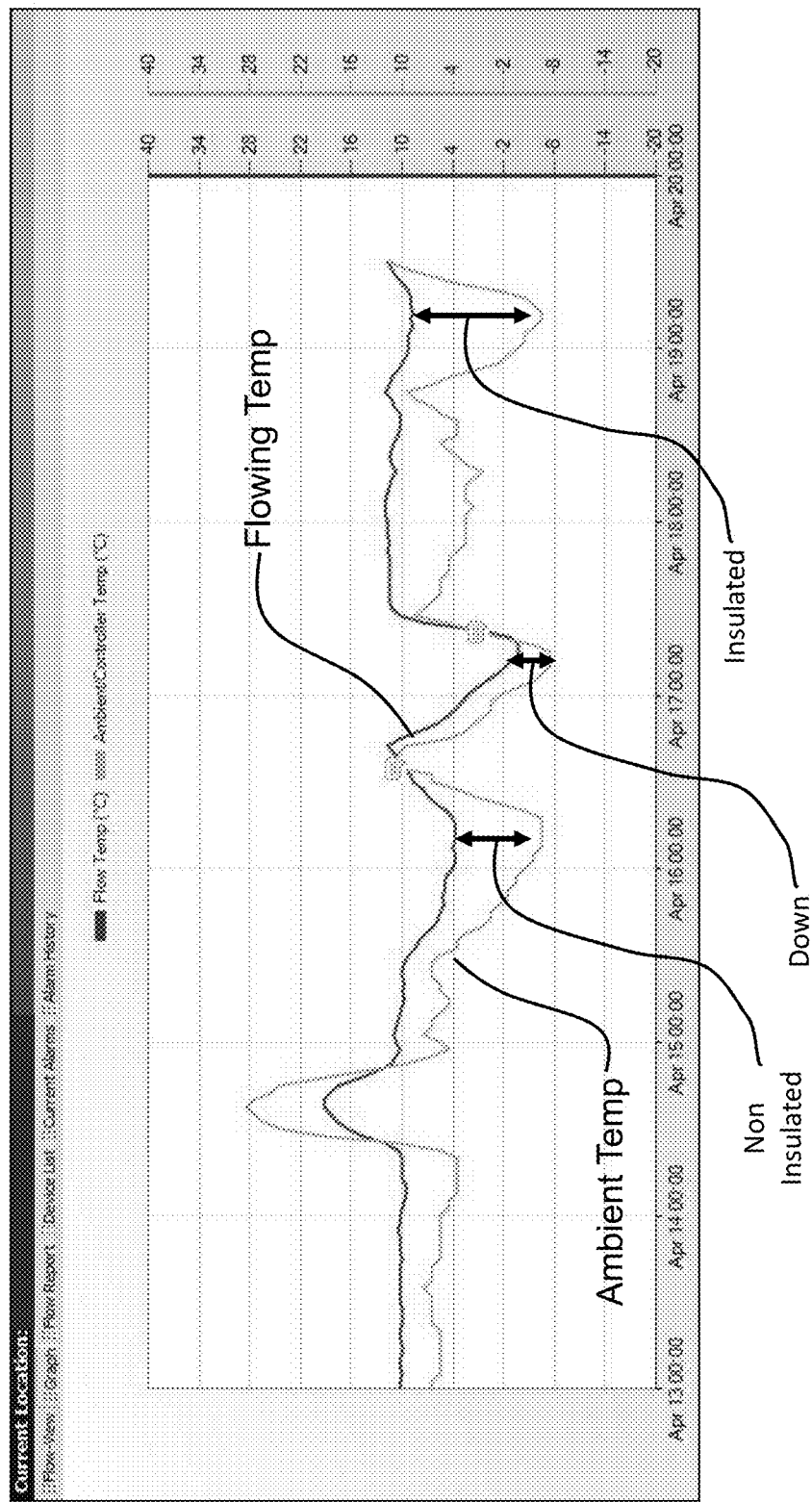
FIG. 22 is a graph of flowing temperature and ambient temperatures for normal flow, for normal flow with the measurement location insulated and not insulated, and when during flow stoppage.
Figure 23:
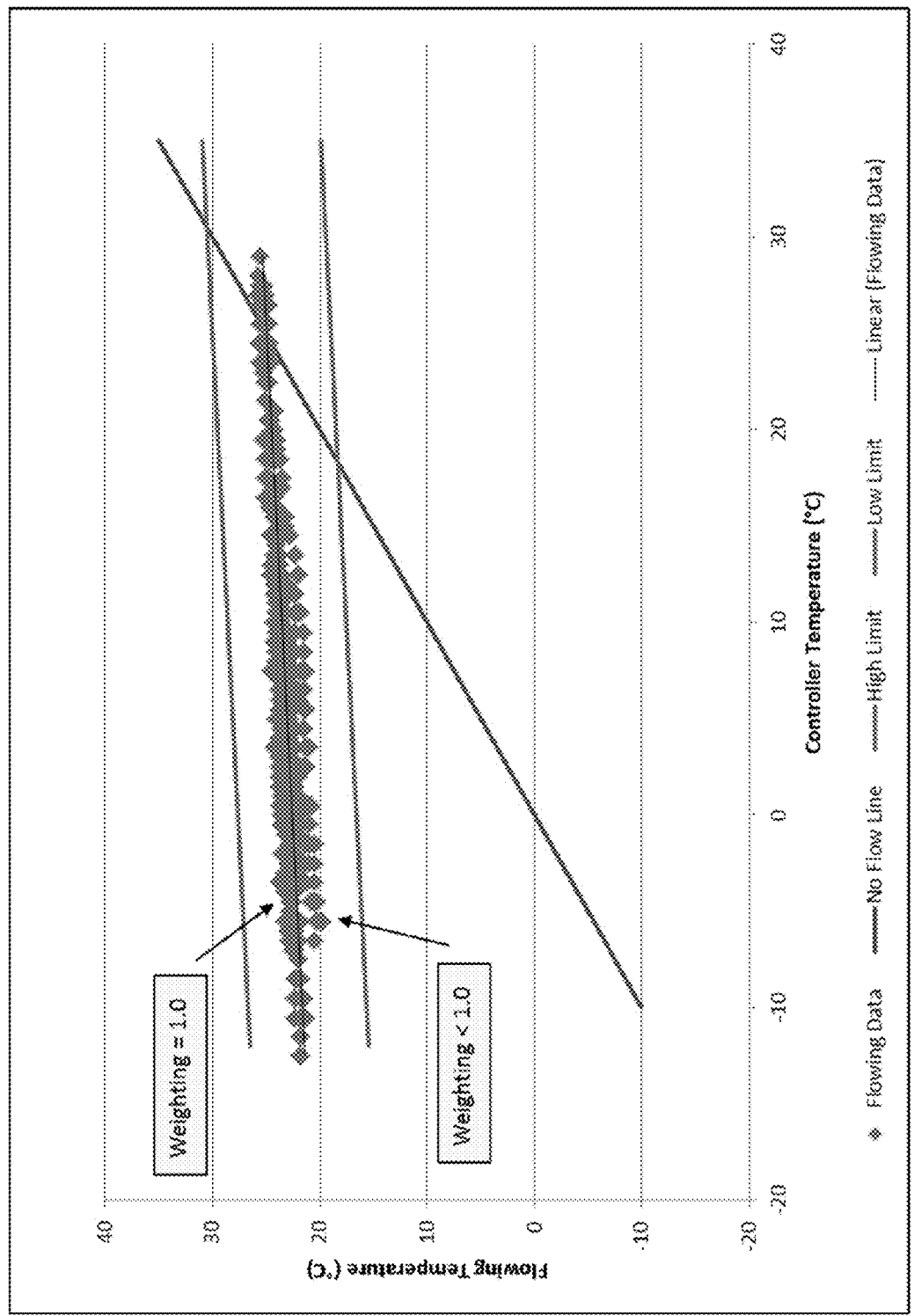
FIG. 23 is a graph according to FIG. 21 illustrating weighting factors based on the degree to which the temperature difference dT varies away from the expected flow relationship.

With reference to FIG. 22, a graph of flowing temperature and ambient temperatures is illustrated for normal flow, for normal flow with the measurement location insulated and not insulated, and when the flow was down, As shown in FIG. 23 the relative weighting of data points can be established based on the degree to which the temperature difference dT varies away from the expected relationship. As previously discussed above, a calculation to establish weighting factors can be linear, exponential, or other mathematical formulations. Weighting factors are established such that as the temperature difference dT approaches the defined range limit, the weighting factor will decrease towards zero, indicating less strong correlation, and less applicability of the measured data point.

A kit, referred to as an onsite watchdog unit, can be provided for upgrading a wellhead for monitoring. One or more sensors are provided, such as one or more temperature sensors, and optionally one or more pressure sensors. Alternatively, one or more sensors, having electronic output, may already at the wellhead for other purposes. The watchdog unit comprises one or more sensor inputs for receiving at least the temperature sensor signals, a memory module for storing data including signals over time, a CPU or processor for managing the sensor signals, and a communications module for transmission of data to a remote site. The processor can merely manage receipt of sensor signals for transmission as signal data, or can perform some or all processing of the signals prior to transmission. An embodiment of a communications module includes satellite communications. Raw signals or processed data, comprising at least data representing actual flow temperature and ambient temperature, is uploaded to a server for further processing as necessary and updating of a mapping module. The server may be accessed by one or more applications including those for updating the mapping module, for regulatory and interested party use.

In one example scenario, measured data channels included flowing temperature (RTD with thermowell), stuffing box temperature (surface RTD) and Ambient temperature (small RTD probe in shade). Data was collected and stored each minute for establishing a normal flow relationship. Once per hour, a dT between the lowest and highest minute reading was calculated and reported. Hourly readings were reported for channels including the three temperatures and other sensors including pressure. All channels were transmitted offsite every four hours for analysis and mapping.

The embodiments of the invention for which an exclusive property or privilege is claimed are defined as follows:

1. A method for identifying wellhead flow anomalies comprising:
    collecting actual flow temperatures and ambient temperatures sensed by at least one sensor at the wellhead for establishing a normal flow relationship for flow from the wellhead for various ambient temperatures;
    measuring actual flow temperatures over time for flow from the wellhead and measuring ambient temperature; and
    determining trending indicators from the actual flow temperature compared to the normal flow relationship for establishing wellhead flow anomalies, wherein the determining of trending indicators further comprises:
    establishing a gap threshold difference representative of a temperature difference between the actual flow temperature and the ambient temperature, and wherein
    values greater than this gap threshold difference indicating normal flow, and
    values less than this gap threshold difference indicating a risk of no flow.

2. The method of claim 1 wherein the determining of trending indicators further comprises comparing the actual flow temperature with the normal flow relationship, wherein actual flow temperature trending with the normal flow relationship indicates normal flow.

3. The method of claim 1 wherein the determining of trending indicators further comprises comparing the actual flow temperature with the normal flow relationship, wherein actual flow temperature trending towards the ambient temperature indicates a risk of no flow.

4. The method of claim 1 wherein the determining of trending indicators further comprises determining,
    where $(abs(Gi-Am)<B$ then $Trend=\log_{10}[abs(Tw-Am)*(Gi-Tw)^2]$
        wherein B is a pre-determined bound, Gi is the flowing temperature, Am is the ambient temperature, Tw is the normal flow temperature emanating from the wellbore, all temperatures in ° C.;
    and if Trend >=B then there is indication of a risk of no flow
    or where $(abs(Gi-Am)>=B$
        then $Trend=\log_{10}[(abs(Tw-Am)*(Gi-Tw)^2)/abs(Gi-Am)^2)]$
    and if Trend >=B then there is indication of a risk of no flow.

5. The method of claim 4 wherein the flow is gas flow from a gas well and Tw is about 5° C.

6. The method of claim 1 wherein the determining of trending indicators further comprises determining a rate of change of relationship between the flowing temperature Gi and ambient temperature Am,
    wherein a rate trend $(TrendR)=d(Gi-Am)*abs(Gi1-Am1)^2$
    where $d(Gi-Am)=(Gi1-Am1)/(Gi0-Am0)$; and
    wherein when TrendR is >100 being indicative of normal flow.

7. The method of claim 6 wherein the flow is gas flow from a gas well.

8. The method of claim 1 wherein the normal flow relationship is a best fit linear relationship.

9. The method of claim 1 wherein the collecting actual flow temperatures and ambient temperatures for establishing the normal flow relationship comprises a sample of over 100 data points.

10. The method of claim 1 wherein the determining of trending indicators further comprises noting the actual flow temperature being equal to the ambient temperature, indicating no flow.

11. The method of claim 1 wherein the determining of trending indicators further comprises:
   determining a predicted flow temperature from the normal flow relationship for the measured ambient temperature;
   establishing values representative of a temperature difference between the actual flow temperature less the predicted flow temperature over time; and
   determining trending indicators from the temperature difference values for establishing flow anomalies.

12. The method of claim 11 wherein the determining of trending indicators further comprises:
   establishing difference bounds about the temperature difference values; and
   comparing temperature difference values to the difference bounds, temperature difference values outside the error bounds being indicative of flow anomalies.

13. The method of claim 12 wherein the determining of trending indicators further comprises
   establishing difference bounds about the temperature difference values; and
   comparing the temperature difference values over time to the difference bounds, negative values being indicative of reduced flow anomalies.

14. The method of claim 11 wherein the determining of trending indicators further comprises:
   establishing difference bounds about the temperature difference values; and
   comparing the temperature difference values to the difference bounds, temperature difference values within the error bounds being indicative of normal flow or flows at risk of no flow.

15. The method of claim 14 wherein the determining of trending indicators wherein temperature difference values approaching the error bounds being indicative of flows at risk of no flow.

16. The method of claim 15 further comprising:
   establishing varying weighting factors for temperature difference values which approaching the error bound for accentuating indications of flow anomalies as temperature difference values approaching the error bounds.

17. The method of claim 14 wherein the determining of trending indicators further comprises
   establishing difference bounds about the square of the temperature difference values; and
   comparing actual flow temperatures to the difference bounds, actual flow temperatures outside the error bounds being indicative of flow anomalies.

18. The method of claim 1 wherein the determining of trending indicators further comprises:
   determining a predicted flow temperature from the normal flow relationship for the measured ambient temperature;
   establishing values representative of a square of a temperature difference between the actual flow temperature less the predicted flow temperature over time; and
   determining trending indicators from the square of the temperature difference value for establishing wellhead flow anomalies.

19. The method of claim 1 wherein the determining of trending indicators further comprises establishing values representative of a rate of change of the temperature difference values.

20. The method of claim 1 further comprising:
   assigning status flags for trending indicators comprising normal flag for normal flows, a risk flag for flows indicating a risk of flow anomalies, and a frozen wellhead; and
   updating a status map having the wellhead displayed thereon for displaying normal, risk or frozen status flags for the wellhead.

21. The method of claim 1 wherein the determining of trending indicators indicates reduced flow anomalies further comprising adding a freeze inhibitor to the wellhead.

22. A kit for identifying wellhead flow anomalies for remote notification comprises:
   sensors for measuring actual flow temperature and ambient temperature at the wellhead; and
   at least one processor for receiving signals representing actual flow temperature and ambient temperatures from the well and for determining trending indicators from the actual flow temperature and the ambient temperatures wherein the determining of trending indicators further comprises:
   establishing a gap threshold difference representative of a temperature difference between the actual flow temperature and the ambient temperature and wherein
   values greater than this gap threshold difference indicating normal flow, and
   values less than this gap threshold difference indicating a risk of no flow.

23. The kit of claim 22, wherein the at least one processor comprises a remote processing unit and the data, of at least the actual flow temperature and ambient temperatures is uploaded to the remote processing unit by a communication transmission device.

* * * * *